United States Patent
Jangid et al.

(10) Patent No.: US 11,889,574 B2
(45) Date of Patent: Jan. 30, 2024

(54) METHOD AND APPARATUS FOR PRIORITIZING LTE CELLS IN WIRELESS COMMUNICATION SYSTEM SUPPORTING ENDC (E-UTRAN NR DUAL CONNECTIVITY)

(71) Applicant: SAMSUNG ELECTRONICS CO., LTD., Suwon-si (KR)

(72) Inventors: Alok Kumar Jangid, Bangalore (IN); Abhishek Kaswan, Bangalore (IN); Aman Agarwal, Bangalore (IN); Kailash Kumar Jha, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 146 days.

(21) Appl. No.: 17/324,305

(22) Filed: May 19, 2021

(65) Prior Publication Data
US 2021/0368568 A1 Nov. 25, 2021

(30) Foreign Application Priority Data

May 19, 2020 (IN) .............................. 202041021086
Apr. 15, 2021 (IN) .............................. 202041021086

(51) Int. Cl.
*H04W 76/15* (2018.01)
*H04L 1/20* (2006.01)
(Continued)

(52) U.S. Cl.
CPC ............. *H04W 76/15* (2018.02); *H04L 1/203* (2013.01); *H04W 8/24* (2013.01); *H04W 48/20* (2013.01); *H04W 72/0453* (2013.01)

(58) Field of Classification Search
None
See application file for complete search history.

(56) References Cited

U.S. PATENT DOCUMENTS

2014/0066055 A1   3/2014   Balakrishnan et al.
2016/0095156 A1*  3/2016   Mitra .................... H04W 48/16
                                                    370/329
(Continued)

FOREIGN PATENT DOCUMENTS

EP     3668183 A1      6/2020
IN     201941036057 A  9/2019
WO     2019/146542 A1  8/2019

OTHER PUBLICATIONS

"NR; Requirements for support of radio resource management", Published Jul. 31, 2018, 3GPP TS 38.133 version15.2.0, Total 79 pages, http://www.3gpp.org.

(Continued)

*Primary Examiner* — Ajit Patel
*Assistant Examiner* — Liem H. Nguyen
(74) *Attorney, Agent, or Firm* — Sughrue Mion, PLLC

(57) ABSTRACT

Provided is a method performed by a user equipment (UE) in a wireless communication system supporting Evolved Universal Mobile Telecommunications System Terrestrial Radio Access Network (E-UTRAN) New Radio (NR)-Dual Connectivity (ENDC). The method includes: receiving system information including information on an NR band list supported in the ENDC; identifying, based on the system information, NR bands supported at LTE frequencies of Long Term Evolution (LTE) bands in a most recently used (MRU) LTE frequency list of the UE; prioritizing the LTE frequencies in the MRU LTE frequency list, based on the supported NR bands and an ENDC capability of the UE; and performing a cell selection based on the prioritized MRU LTE frequency list.

18 Claims, 8 Drawing Sheets

(51) Int. Cl.
*H04W 8/24* (2009.01)
*H04W 48/20* (2009.01)
*H04W 72/0453* (2023.01)

(56) References Cited

U.S. PATENT DOCUMENTS

| | | | |
|---|---|---|---|
| 2017/0070931 A1* | 3/2017 | Huang | H04W 36/08 |
| 2018/0070250 A1* | 3/2018 | Venkataraman | H04W 48/08 |
| 2018/0092085 A1* | 3/2018 | Shaheen | H04W 36/14 |
| 2018/0152872 A1 | 5/2018 | Wirtanen et al. | |
| 2018/0176710 A1* | 6/2018 | Jang | H04W 88/10 |
| 2018/0343697 A1* | 11/2018 | Hsu | H04W 76/16 |
| 2019/0223091 A1* | 7/2019 | Huang-Fu | H04W 72/543 |
| 2020/0163142 A1* | 5/2020 | Ryoo | H04W 24/10 |
| 2020/0351643 A1* | 11/2020 | Dhanapal | H04W 72/56 |
| 2020/0367318 A1 | 11/2020 | Takahashi et al. | |
| 2021/0099934 A1* | 4/2021 | Panchal | H04W 76/27 |
| 2021/0266801 A1* | 8/2021 | Shah | H04W 76/16 |
| 2021/0282092 A1* | 9/2021 | Wei | H04W 52/34 |
| 2021/0345204 A1* | 11/2021 | Matolia | H04W 36/0088 |
| 2021/0400748 A1* | 12/2021 | Subramanian | H04W 28/0865 |
| 2022/0030525 A1* | 1/2022 | Chincholi | H04W 52/367 |
| 2022/0322130 A1* | 10/2022 | Muruganathan | H04W 16/14 |
| 2023/0141478 A1* | 5/2023 | Zhang | H04W 40/12 370/315 |
| 2023/0180072 A1* | 6/2023 | Ranjan | H04W 48/18 455/436 |

OTHER PUBLICATIONS

Teyeb et al., "Evolving LTE to fit the 5G Future", Jan. 31, 2017 (Jan. 30, 2017), 18 pages.
Communication dated Mar. 31, 2022 issued by Intellectual Property India in counterpart Indian Patent Application No. 202041021086.
International Search Report (PCT/ISA/210) issued by the International Searching Authority in International Application No. PCT/KR2021/006235, dated Aug. 27, 2021.
Written Opinion (PCT/ISA/237) issued by the International Searching Authority in International Application No. PCT/KR2021/006235, dated Aug. 27, 2021.
Huawei et al., "EN-DC bandlist for 5G indicator", 3GPP TSG-RAN WG2 Meeting 109bis-e, R2-2003420, Apr. 20-30, 2020, pp. 1-3 (3 pages total).

* cited by examiner

METHOD AND APPARATUS FOR PRIORITIZING LTE CELLS IN WIRELESS COMMUNICATION SYSTEM SUPPORTING ENDC (E-UTRAN NR DUAL CONNECTIVITY)

CROSS-REFERENCE TO RELATED APPLICATION(S)

This application is based on and claims priority under 35 U.S.C. 119 to Indian Provisional Patent Application No. 202041021086, filed on May 19, 2020, and Indian Complete Patent Application No. 202041021086 filed on Apr. 15, 2021, the disclosures of which are incorporated herein by reference in their entirety.

BACKGROUND

1. Field

The disclosure relates to a method and apparatus for Evolved Universal Mobile Telecommunications System Terrestrial Radio Access Network (E-UTRAN) New Radio (NR) Dual Connectivity (ENDC) operations.

2. Description of Related Art

Referring to 3GPP ($3^{rd}$ Generation Partnership Project) TS 37.340, MR-DC (Multi-Radio Dual Connectivity), which generalizes E-UTRA Dual Connectivity (DC), is specified. A user equipment (UE) capable of transmitting and receiving may use resources provided by different nodes (base stations, cells, etc.). In MR-DC, the different nodes may be, for example, one node providing $5^{th}$ Generation (5G)-based NR access and another node providing E-UTRA or NR access. The one node operates as a master node (MN), the other node operates as a secondary node (SN), and the MN and the SN are connected through a network interface, and at least the MN is connected to a core network of an LTE (Long Term Evolution) system or a 5G system. TS 37.340 defines E-UTRAN New radio Dual Connectivity (ENDC) as a type of MR-DC.

In the ENDC, the E-UTRAN supports the DC that a UE is connected to an evolved Node B (eNB), which is a base station of the LTE cell, as the MN and is connected to the gNB, which is a base station of the NR cell, as the SN. The eNB is connected to the Evolved Packet Core (EPC), which is the core network of the LTE system through the Si interface, and is connected to the gNB through the X2 interface.

Referring to a current 3GPP standard, if a UE supporting the END is located in an area falling in a common coverage area of a plurality of Long Term Evolution (LTE) cells, there are no means available to the UE for prioritizing the LTE cells based on the availability of New Radio (NR) support in either of the LTE cells. In an example, when a UE can be located in a common coverage area of first to third LTE cells, where the first cell supports NR and NR bands that are not supported by the UE, the second LTE cell supports NR and NR bands that are supported by the UE, and the third LTE cell does not support NR. Here, the UE may not able to prioritize an LTE cell, amongst the three LTE cells, based on criteria defined by 3GPP for cell selection/reselection or target cell handover.

FIG. 1 illustrates the example scenario, in which a UE located within coverage areas of LTE cells is unable to select one of the LTE cells appropriately for availing the ENDC.

Referring to FIG. 1, a UE is located within a common coverage area of three LTE cells (101, 103, 105). Each of the three LTE cells includes an eNB. A first LTE cell (101) with eNB-1 (101a) supports $5^{th}$ Generation (5G) communications. The NR band(s) supported by the first LTE cell (101) may not be supported by the UE. A second LTE cell (103) with eNB-2 (103a) supports 5G communications. The NR band(s) supported by the second LTE cell (103) are supported by the UE (200). The third LTE cell (105) with eNB-3 (105a) does not support 5G communications. In case the UE (200) intends to avail ENDC service(s), the UE (200) needs to camp on the second LTE cell (103). However, the UE (200) may not be able to prioritize the second LTE cell (103) over the first and third LTE cells (103, 105). The above issue occurs during cell selection/reselection (when the UE (200) is in an idle mode) and/or during handover (when the UE is in a connected mode).

The UE may support at least one NR band if the UE camps on an LTE cell at a particular frequency of an LTE band. For example, if the UE camps on a cell at a frequency of an L-1 band, the UE can support frequencies of NR bands N-1 and N-2. If the UE camps on a cell at a frequency of an L-2 band, the UE can support frequencies of NR bands N-1, N-3 and N-4. If the UE camps on a cell at a frequency of an L-3 band or an L-4 band, the UE does not support 5G communication (NR band frequencies). A following Table 1 depicts an example of the ENDC capability of the UE.

TABLE 1

| LTE Band | Supported NR Bands |
|---|---|
| L-1 | N-1, N-2 |
| L-2 | N-1, N-3, N-4 |
| L-3 | N/A |
| L-4 | N/A |

Consider that the first LTE cell (Cell-1) supports NR frequencies in NR bands N-3 and N-5 at LTE frequencies in LTE band L-1. For simplicity of description, Cell-1 is considered to support LTE frequencies from a single LTE band. It is expected that Cell-1 can support LTE frequencies, from a plurality of LTE bands, in one or more Public Land Mobile Networks (PLMNs). The second LTE cell (Cell-2) supports NR frequencies in NR bands N-1, N-2 and N-5 at LTE frequencies in LTE band L-2. The third cell (Cell-3) does not support NR frequencies (5G communication) of any NR band at LTE frequencies in LTE band L-3. A following Table 2 depicts an example of ENDC support provided by LTE cells-1, 2 and 3.

TABLE 2

| Cell | LTE Band | Supported NR Bands |
|---|---|---|
| Cell-1 | L-1 | N-3, N-5 |
| Cell-2 | L-2 | N-1, N-2, N-5 |
| Cell-3 | L-3 | N/A |

By comparing the ENDC capability of the UE and the ENDC support provided by the LTE Cells-1, 2 and 3, the UE may avail ENDC services by camping on Cell-2. The UE may avail LTE service using LTE band L-2 and avail NR service using the NR band N1, as Cell-2 supports the NR bands N-1 at LTE band L-2. However, the UE may not be able to prioritize Cell-2 over Cell-1 and Cell-3.

For example, during cell selection/reselection/handover/ inter or intra Radio Access Technology (RAT) redirection, the ENDC capability of the UE may not be taken be into account while deciding a target cell. In this case, the UE may select/reselect/handover to an LTE cell which does not support NR (cell-3) or an LTE cell supporting 5G with NR bands not supported by the ENDC capability of the UE (cell-1). Even if the UE is within a common coverage of two LTE cells supporting NR, and the NR bands supported by the LTE cells are supported by the UE as part of ENDC capability of the UE, there is a possibility that the UE may select, reselect or handover, to the LTE cell that supports an NR band offering a lower throughput, over the other LTE cell that supports an NR band offering a higher throughput. Thus, user experience would be affected if the UE is not able to select an appropriate LTE cell (supporting NR and offering a high throughput).

SUMMARY

An aspect of the disclosure is to provide a method and apparatus for efficiently prioritizing LTE cells in a wireless communication system supporting E-UTRAN NR dual connectivity (ENDC).

An aspect of the embodiments disclosed herein provides a method and apparatus for prioritizing selection of LTE cells providing a NR support during cell selection, cell reselection, handover to a target cell, inter Radio Access Technology (RAT) redirection from a wireless network, intra RAT redirection from the wireless network, and so on, while NR bands supported by the prioritized LTE cells match ENDC capability of a UE.

Another aspect of the embodiments disclosed herein is to detect an NR support provided by LTE cells based on Information Elements (IEs), such as a BandListENDC, a PLMN-InfoList, and an NR-BandList, included in a System Information Block (SIB) broadcasted by LTE cells.

Another aspect of the embodiments disclosed herein is to enable a UE to select an LTE cell supporting NR, amongst a plurality of LTE cells supporting NR, where a throughput offered by an NR band supported by the LTE cell, selected by the UE, is the highest amongst throughputs offered by the other NR bands supported by the selected LTE cell and NR bands supported by the other LTE cells supporting NR.

Another aspect of the embodiments disclosed herein is to select an appropriate cell providing Multi-RAT services based on a Multi-RAT Dual Connectivity (MRDC) capability of the UE, where the MRDC is a combination of 5G RAT and $6^{th}$ Generation (6G) RAT, or NR-Frequency-1 (FR-1) and NR-Frequency-2 (FR-2).

Another aspect of the embodiments disclosed herein is to consider an ENDC capability of a UE and NR bands supported by LTE cells, which are stored in a Most Recently Used (MRU) LTE frequency list in a memory of the UE, for selecting an LTE cell from the MRU LTE frequency list during LTE cell selection.

Another aspect of the embodiments disclosed herein is to consider an ENDC capability of a UE and NR bands supported by LTE cells, detected during a Full band scan, for selecting an LTE cell from amongst the detected cells during LTE cell selection.

Another aspect of the embodiments disclosed herein is to create a candidate priority list comprising LTE cells, which are detected as suitable for LTE cell reselection per 3GPP criteria, where the LTE cells in the candidate priority list may be prioritized for LTE cell reselection based on at least one of an ENDC capability of a UE and NR bands supported by the LTE cells in the candidate priority list.

Another aspect of the embodiments disclosed herein is to create a candidate priority list including LTE cells, where the LTE cells support at least one LTE frequency or at least one LTE band to which a UE is redirected to, by a wireless network, where the LTE cells in a candidate priority list may be prioritized for LTE cell redirection based on an ENDC capability of the UE and NR bands supported by the LTE cells in the candidate priority list.

Another aspect of the embodiments disclosed herein is to create a candidate priority list including LTE cells, where the LTE cells are detected as suitable target LTE cells for LTE cell handover per 3 GPP measurement object criteria, where the LTE cells in a candidate priority list may be prioritized for sending measurement reports pertaining to the LTE cells to a wireless network based on at least one of an ENDC capability of a UE and NR bands supported by the LTE cells in the candidate priority list.

Accordingly, the embodiments provide a method performed by a user equipment (UE) in a wireless communication system supporting ENDC, the method comprises receiving system information comprising information on an NR band list supported in the ENDC; identifying, based on the system information, NR bands supported at LTE frequencies of LTE bands in a MRU LTE frequency list of the UE; prioritizing the LTE frequencies in the MRU LTE frequency list, based on the supported NR bands and an ENDC capability of the UE; and performing a cell selection based on the prioritized LTE frequencies in the MRU LTE frequency list.

Accordingly, the embodiments provide a UE in a wireless communication system supporting ENDC, the UE comprises a communication interface; and a processor configured to receive system information comprising information on an NR band list supported in the ENDC through the transceiver, identify, based on the system information, NR bands supported at LTE frequencies of LTE bands in a MRU LTE frequency list of the UE, prioritize the LTE frequencies in the MRU LTE frequency list, based on the supported NR bands and an ENDC capability of the UE, and perform a cell selection based on the prioritized LTE frequencies in the MRU LTE frequency list.

Accordingly, the embodiments provide methods and systems for prioritizing selection of LTE cells, by a UE, based on NR support provided by the LTE cells and an ENDC capability of the UE. The embodiments include prioritizing the LTE cells for enabling the UE to camp on the LTE cells during at least one of cell selection, cell reselection, cell redirection, and target cell handover, on determining that the ENDC capability of the UE matches the NR bands that are supported by the LTE cells at corresponding LTE bands.

The embodiments include detecting the NR support provided by the LTE cells based on at least one Information Element (IE) included in System Information Block (SIB) broadcasted by the LTE cells, respectively. The embodiments ensure that the UE selects an LTE cell supporting the NR, amongst a plurality of LTE cells supporting the NR, wherein a throughput offered by a NR band supported by the selected LTE cell is the highest amongst NR bands supported by the selected LTE cell and NR bands supported by the other LTE cells.

In an embodiment, the ENDC capability of the UE and the NR bands supported by the LTE cells, in a MRU LTE frequency list stored in the UE, may be considered for selecting an LTE cell from the MRU LTE frequency list during LTE cell selection. In an embodiment, the ENDC capability of the UE and the NR bands supported by the LTE cells, which are detected during a full band scan, may be considered for selecting an LTE cell from amongst the detected cells during LTE cell selection.

In an embodiment, a candidate priority list is created, which includes LTE cells that have been detected as suitable for LTE cell reselection. The suitability may be determined based on 3GPP cell reselection criteria. The embodiments include prioritizing the LTE cells in the candidate priority list for LTE cell reselection based on at least one of the ENDC capability of the UE and the NR bands supported by the LTE cells in the candidate priority list.

In an embodiment, a candidate priority list is created, which includes LTE cells supporting at least one LTE frequency or at least one LTE band. The UE is redirected to, by a wireless network, the at least one LTE frequency or the at least one LTE band. The LTE cells in the candidate priority list may be prioritized for LTE cell redirection based on at least one of the ENDC capability of the UE and the NR bands supported by the LTE cells in the candidate priority list.

In an embodiment, a candidate priority list is created, which includes LTE cells that have been detected as suitable target LTE cells for LTE cell handover. The suitability may be determined based on 3GPP measurement object criteria. The embodiments include prioritizing the LTE cells in the candidate priority list for sending measurement reports pertaining to the LTE cells to a wireless network based on the ENDC capability of the UE and the NR bands supported by the LTE cells in the candidate priority list.

In an embodiment, the UE detects LTE cells supporting an LTE frequency of a LTE band, wherein the UE is redirected to the LTE frequency of the LTE band by a wireless network, wherein each of the detected LTE cells support a predefined cell reselection criteria, determines NR support provided by each of the detected LTE cells supporting the LTE frequency of the LTE band based on system information pertaining to each of the detected LTE cells supporting the LTE frequency of the LTE band, creates a candidate priority list comprising the LTE cells, supporting the LTE frequency of the LTE band, satisfying the predefined cell reselection criteria, wherein the LTE cells in the candidate priority list are prioritized for cell redirection based on the NR support provided by each of the detected LTE bands and the ENDC capability of the UE, redirects to a first LTE cell in the candidate priority list supporting the LTE frequency of the LTE band, wherein NR support provided by the first LTE cell, redirected to, by the UE, is matching the ENDC capability of the UE, wherein the first LTE cell, redirected to, by the UE, is either the best LTE cell in the candidate priority list satisfying the predefined cell reselection criteria or if the first LTE cell, redirected to, by the UE, is not inferior to the best LTE cell by the predefined threshold.

In an embodiment, the UE detects an A3 measurement event triggered by a LTE network, wherein the A3 measurement event is triggered when the UE is in CONNECTED mode, detects LTE frequencies of associated LTE bands, supported by neighbouring LTE cells, which are satisfying a predefined measurement object criteria, determines NR support provided by each of the detected LTE frequencies of the associated LTE bands based on system information pertaining to each of the detected LTE frequencies of the associated LTE bands, creates a candidate priority list comprising the neighboring LTE cells, supporting the detected LTE frequencies of the associated LTE bands that are satisfying the predefined measurement object criteria, wherein the neighboring LTE cells in the candidate priority list are prioritized for sending measurement reports pertaining to the neighbouring LTE cells based on NR support provided by the detected LTE frequencies of the associated LTE bands supported by the neighboring LTE cells and the ENDC capability of the UE, and detects a A5 measurement event triggered by the LTE network, wherein the A5 measurement event is triggered when the UE is in CONNECTED mode, sends measurement reports pertaining to the neighbouring LTE cells in the candidate priority list, supporting the detected LTE frequencies of the associated LTE bands, to the LTE network in sequence, wherein the sequence of sending the measurement reports is based on priorities allocated to the neighbouring LTE cells, wherein the measurement reports are sent if one of the neighbouring LTE cells is either the best neighbouring LTE cell satisfying the predefined measurement object criteria or if the neighbouring LTE cells are not inferior to the best neighbouring LTE cell by a predefined threshold, wherein the NR support provided at the detected LTE frequencies of the associated LTE bands in the neighboring LTE cells, for which the measurement reports are sent, is matching the ENDC capability of the UE.

These and other aspects of the embodiments herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

Embodiments herein are illustrated in the accompanying drawings, in which.

DETAILED DESCRIPTION

Figure 1:
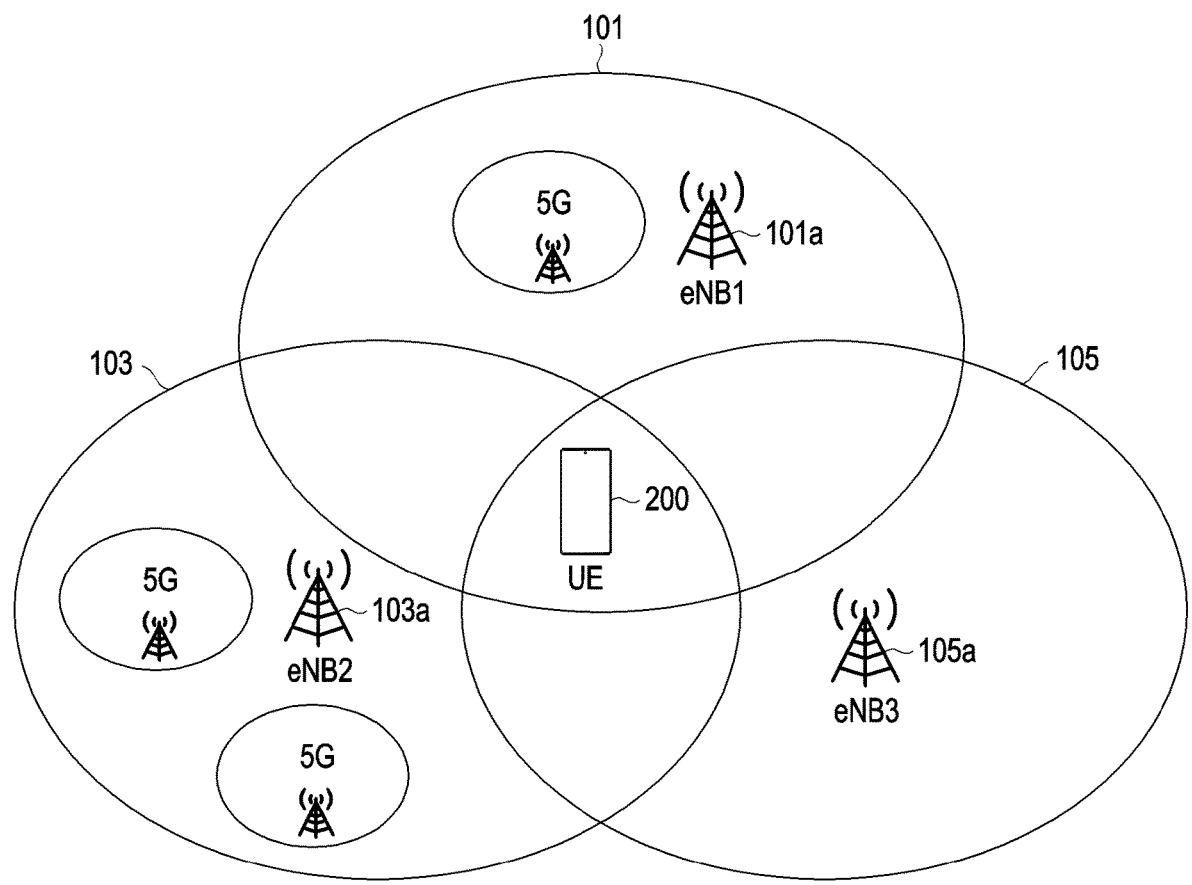
FIG. 1 illustrates an example scenario, in which a User Equipment (UE) located within a common coverage areas of three Long Term Evolution (LTE) cells is unable to select one of the three LTE cells appropriately for availing E-UTRAN New Radio Dual Connectivity (ENDC) services.

The embodiments and various aspects and advantageous details thereof are explained more fully with reference to the accompanying drawings in the following descriptions. Descriptions of well-known components and processing techniques are omitted so as to not unnecessarily obscure the embodiments disclosed herein. The examples used herein are intended merely to facilitate an understanding of ways in which the embodiments may be practiced and to further enable those of skill in the art to practice the embodiments. Accordingly, the examples should not be construed as limiting the scope of the disclosure herein.

The embodiments are directed to methods and systems for prioritizing selection of a plurality of LTE cells based on New NR support provided by the LTE cells. The embodiments include detecting that an ENDC capability of a UE matches NR bands supported by the LTE cells at corresponding LTE bands. The embodiments consider the ENDC capability of the UE and NR bands supported by the LTE cells, for selecting an LTE cell, amongst the LTE cells, during cell selection procedure. The LTE cells can be in a Most Recently Used (MRU) LTE frequency list or the LTE cells have been detected during a Full band scan by the UE.

The embodiments provide creating a candidate priority list including a plurality of LTE cells. In an embodiment, the LTE cells have been detected as suitable for LTE cell reselection based on 3GPP cell reselection criteria. In an embodiment, the LTE cells may support an LTE frequency of an LTE band, to which a UE has been redirected by a wireless network. In an embodiment, the LTE cells have been detected as suitable target LTE cells for LTE cell handover based on 3GPP measurement object (target cell) criteria. The embodiments also provide prioritizing the LTE cells in a candidate priority list for LTE cell reselection, cell redirection, and sending measurement reports pertaining to the LTE cells to the wireless network, based on at least one of an ENDC capability of the UE and the NR bands supported by the LTE cells in the candidate priority list.

Referring now to the drawings, and more particularly to FIGS. 2 through 6, where similar reference characters denote corresponding features consistently throughout the figures, the following embodiments are described.

Figure 2:
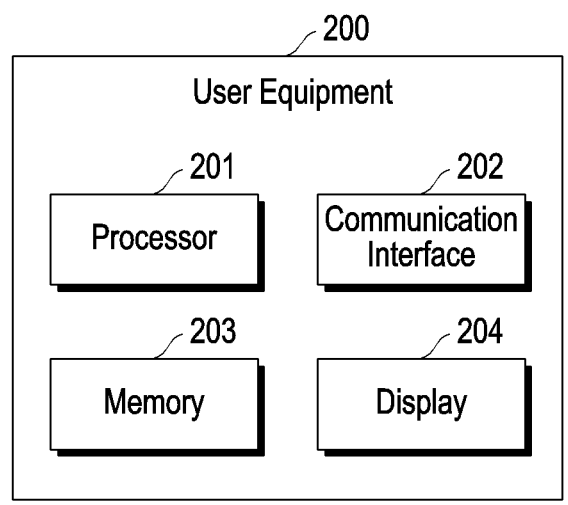
FIG. 2 illustrates a plurality of components of a UE configured to prioritize LTE cells based on New Radio (NR) support provided by the LTE cells and an ENDC capability of the UE, according to embodiments.

FIG. 2 illustrates a plurality of components of a UE 200 that may be configured to prioritize LTE cells based on NR support provided by a plurality of LTE cells and an ENDC capability of the UE 200, according to embodiments.

As depicted in FIG. 2, the UE 200 may include a processor 201, a communication interface 202, a memory 203, and a display 204. The communication interface 202 may be a transceiver that refers to a receiver and a transmitter. The processor 201 may be at least one processor, and may be referred to as a controller or a control unit. The processor 201 may control the entire apparatus of the UE 200 so that the UE 200 operates according to each of the embodiments of the present disclosure as well as a combination of at least one embodiment. However, the components of the UE 200 are not limited to the above-described example. For example, the UE 200 may include more or fewer components than the above-described components. In addition, the transceiver, memory, and processor may be implemented in the form of at least one chip. The transceiver may transmit and receive signals to and from the base station. Here, the signal may include at least one of control information and data. The transceiver may include an RF transmitter that up-converts and amplifies a frequency of a transmitted signal, and an RF receiver that amplifies a received signal with low noise and down-converts a frequency. However, this is only an embodiment of the transceiver, and components of the transceiver are not limited to the RF transmitter and the RF receiver. In addition, the transceiver may receive a signal through a wireless channel, output it to the processor 201, and transmit a signal output from the processor 201 through the wireless channel. The memory 203 may store programs and data necessary for the operation of the UE 200. In addition, the memory 203 may store control information or data included in signals transmitted and received by the UE 200. The memory 203 may be composed of a storage medium such as read only memory (ROM), random access memory (RAM), hard disk, CD-ROM, and digital video disc (DVD), or a combination of storage media. Also, there may be a plurality of memories. In addition, the processor 201 may control a series of processes so that the UE 200 may operate according to embodiments of the present disclosure.

The UE 200 may prioritize the LTE cells for cell selection, cell reselection, cell redirection, and/or handover to a target cell. The UE 200 can match the ENDC capability of the UE 200 NR bands that can be supported by the UE 200 when the UE 200 is connected to LTE frequencies of a particular LTE band. The LTE frequencies may be supported by at least one Public Land Mobile Network (PLMN) in at least one LTE cell.

In an embodiment, the UE 200 may be configured with MRDC capability. The UE 200 may select a cell of a first RAT and determine a capability of the cell to support bands of a second RAT. In an example, the MRDC capability of the UE 200 is a combination of 5G and 6G, or FR-1 and FR-2.

In an embodiment, the UE 200 may receive information broadcasted from different LTE cells in the vicinity of the UE 200 through the communication interface 202 which may include any one or any combination of an antenna(s), a digital modem, a radio frequency (RF) modem, a WiFi chip, and related software and/or firmware. The UE 200 can receive SystemInformationBlock (SIB) broadcasted by different LTE cells. For example, the SystemInformationBlock (SIB) may include SystemInformationBlockType26A message. Referring to the 3GPP standard, the System Information BlockType 26A may be exemplified as follows.

| SystemInformationBlockType26a information element |
|---|
| -- ASN1START |
| SystemInformationBlockType26a-r16 ::= SEQUENCE { |
|     plmn-InfoList-r16                      PLMN-InfoList-r16, |
|     bandListENDC-r16                   BandListENDC-r16, |
|     lateNonCriticalExtension           OCTET STRING                OPTIONAL, |
|     ... |
| } |
| BandListENDC r16 ::=     SEQUENCE (SIZE (1.. maxBandsENDC r16) ) OF FreqBandIndicatorNR r15 |
| PLMN-InfoList-r16 ::=    SEQUENCE (SIZE (0...maxPLMN-r11) ) OF PLMN-Info-r16 |
| PLMN-Info-r16 ::=       SEQUENCE { |
|     nr-BandList-r16 ::=      BIT STRING (SIZE(maxBandsENDC-r16) ) OPTIONAL     -- Need OR |
| } |
| -- ASN1STOP |

| SystemInformationBlockType26a information element |
|---|
| SystemInformationBlockType26a field descriptions |
| bandListENDC<br>A list of NR bands which can be configured as SCG in<br>EN-DC operation with serving cell for the forwarding of<br>upperLayerIndication to upper layers.<br>plmn-infoList<br>This field includes the same number of entries, and<br>listed in the same order as PLMNs across the plmn-IdentityList<br>fields plmn-IdentityList and plmn-IdentityList-r14 included<br>in SIB1. I.e. the first entry corresponds to the first entry of<br>the combined list that results from concatenating the entries<br>included in the second to the original plmn-IdentityList<br>field in SIB1. If the size of the field is set to 0, all bands<br>in bandListENDC apply for all PLMNs listed in SIB1.<br>nr-BandList<br>This field indicates a list of bands and is encoded as<br>a bitmap, where the bit N is set to "1" if the<br>current serving cell supports EN-DC operation with the<br>N-th NR band in bandListENDC. The bits which have no<br>corresponding bands in bandListENDC shall be set to 0;<br>bit 1 of the bitmap is the leading bit of the bit string. |

The SystemInformationBlockType26A may include at least one of information such as a BandListENDC, a PLMN-InfoList, and an NR-BandList, which may be utilized by the UE 200 to determine the NR bands supported by the LTE cells at each of the different LTE bands supported by the LTE cells. In another example, at least one of the information received by the UE 200 may be provided through higher layer signaling (for example, Radio Resource Control (RRC) signaling) or L1 signaling (for example, downlink control information (DCI)).

Cell Selection

When the UE 200 performs an LTE cell selection procedure, the processor 201 may check a Most Recently Used (MRU) LTE frequency list stored in the memory 203 of the UE 200. The UE 200 may intend to select an MRU LTE frequency, and camp on an LTE cell at the MRU LTE frequency. An example MRU LTE frequency list is depicted in a following Table 3.

TABLE 3

| Index | E-UTRAN frequency | PLMN |
|---|---|---|
| 1 | 8665 (L-3) | 312-001 |
| 2 | 40620 (L-1) | 310-002 |
| 3 | 10140 (L-4) | 310-003 |
| 4 | 8473 (L-2) | 311-004 |

As depicted in the Table 3, LTE frequencies of different LTE bands, that is, L-1, L-2, L-3 and L-4, are sorted based on MRU by the UE 200. In general, the UE 200 is expected to camp on an LTE cell at an E-UTRAN (LTE) frequency 8665 of LTE band L-3 in a first attempt. If the UE 200 is not able to camp on an LTE cell at the LTE frequency 8665 of an LTE band L-3, the UE may attempt to camp on the same LTE cell or a different LTE cell at an LTE frequency 40620 of an LTE band L-1. If the UE 200 is not able to detect an LTE cell supporting a frequency listed in a particular index of the MRU list, the UE 200 may attempt to camp on LTE cells at E-UTRAN frequencies listed in the succeeding indices of the MRU list.

However, if the UE 200 intends to utilize the ENDC capability (of availing LTE and NR services at the same time), the UE 200 may check a system information broadcasted by an LTE cell in which the UE 200 camped. For example, if the UE 200 camps on an LTE cell at an E-UTRAN frequency 8473 of an LTE band L-2, the UE 200 may check the system information broadcasted by the LTE cell to determine NR bands supported by the LTE cell at the LTE band L-2. If the LTE cell does not support any NR band at the LTE band L-2 or if at least one NR band supported by the LTE cell at the LTE band L-2 does not match the ENDC capability of the UE 200, then the UE 200 will not be able to utilize the ENDC capability. A following Table 4 depicts an example ENDC capability of the UE 200. Information on the ENDC capability may use information previously stored in the UE 200, information configured from a serving cell (for example, an LTE cell), or information determined by performing capability negotiation with a base station of the serving cell may be used.

TABLE 4

| LTE Band | Supported NR Bands |
|---|---|
| L-1 | N-1, N-3, N-4 |
| L-2 | N-1, N-2 |
| L-3 | N/A |
| L-4 | N/A |

As depicted in the Table 4, the UE supports NR bands N-1 and N-2 at the LTE band L-2. Based on a BandListENDC, a PLMN-InfoList, and an NR-BandList, if the UE 200 determines that the LTE cell supports NR bands N-3 and N-4, the ENDC capability of the UE 200 does not match the NR capability of the LTE cell. In this scenario, the UE will not be able to avail NR services.

If the UE 200 camps on an LTE cell at the E-UTRAN frequency 8665 of the LTE band L-3 or an E-UTRAN frequency 10140 of an LTE band L-4, checking the BandListENDC, the PLMN-InfoList, and the NR-BandList, pertaining to the LTE cell is inconsequential. This is because the UE 200 does not support any NR band if the UE 200 camps on an LTE cell at the LTE band L-3 or L-4.

In order to prevent these scenarios, the MRU LTE frequency list may be modified by introducing an additional column, which indicates NR bands supported at LTE frequencies in associated LTE bands, according to an embodiment. The modified MRU LTE frequency list is depicted in a following Table 5.

TABLE 5

| Index | E-UTRAN (LTE) frequency | PLMN | Supported NR Bands |
|---|---|---|---|
| 1 | 8665 (L-3) | 312-001 | N-1 |
| 2 | 40620 (L-1) | 310-002 | N-1, N-2, N-5 |
| 3 | 10140 (L-4) | 310-003 | N-2, N-3 |
| 4 | 8473 (L-2) | 311-004 | N-2, N-6 |

The processor 201 may compare the information (ENDC capability of the UE 200) in the Table 4 with the information (NR bands supported at the MRU LTE frequencies at associated LTE bands) in the Table 5 prior to selecting an LTE cell. The processor 201 may sort the LTE frequencies of the LTE bands to prioritize the LTE frequencies (LTE cells supporting the LTE frequencies) based on the ENDC capability of the UE 200 and the NR bands supported at the MRU LTE frequencies at associated LTE bands. The prioritized MRU LTE frequency list is depicted in a following Table 6.

TABLE 6

| Priority | E-UTRAN (LTE) frequency | PLMN | Supported NR Bands |
|---|---|---|---|
| 1 | 40620 (L-1) | 310-002 | N-1, N-2, N-5 |
| 2 | 8473 (L-2) | 311-004 | N-2, N-6 |
| 3 | 8665 (L-3) | 312-001 | N-1 |
| 4 | 10140 (L-4) | 310-003 | N-2, N-3 |

The processor 201 prioritizes the LTE frequencies 40620 and 8473 as NR bands supported at the LTE frequencies (at LTE bands L-1 and L-2 respectively) match the ENDC capability of the UE 200. The UE 200 supports NR band N-1 at the LTE band L-1 and supports NR band N-2 at the LTE band L-2. The priority of the LTE frequency 40620 (L-1) is higher than the priority of LTE frequency 8473 (L-2) based on the MRU LTE frequency list. Similarly, the priority of LTE frequency 8665 (L-3) the priority of LTE frequency 10140 (L-4).

Figure 3:
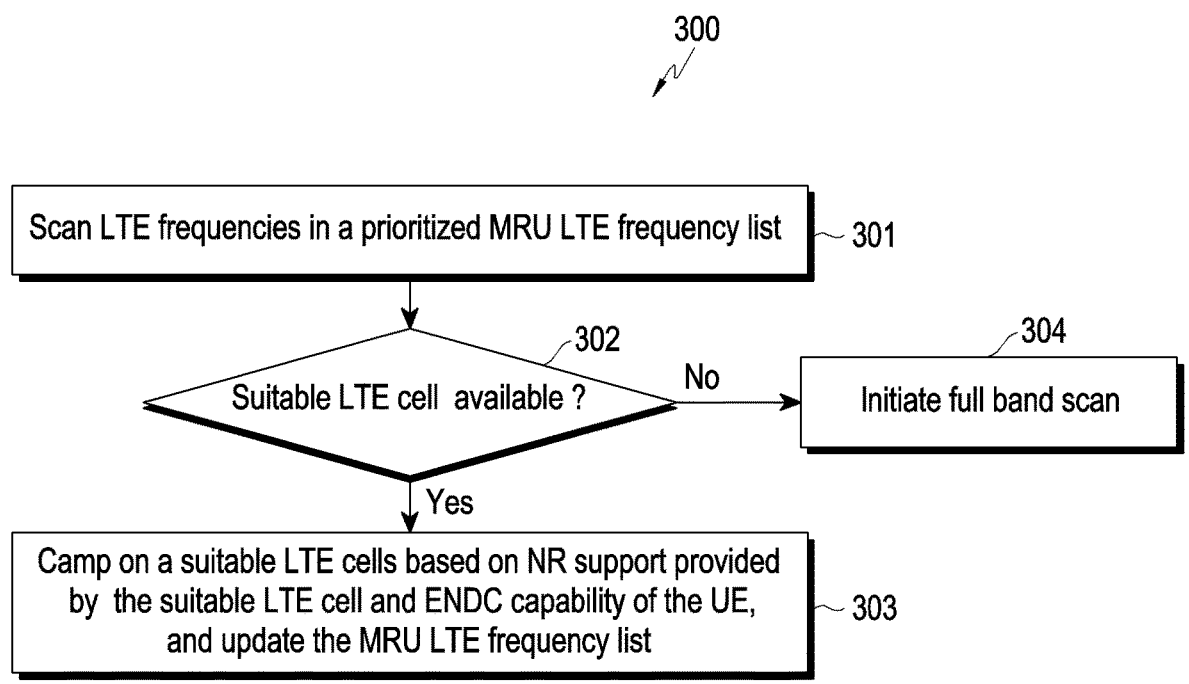
FIG. 3 is a flowchart illustrating a method for prioritizing LTE frequencies in a Most Recently Used (MRU) LTE frequency list for LTE cell selection, according to embodiments.

FIG. 3 illustrates a method 300 for prioritizing LTE frequencies in an MRU LTE frequency list for LTE cell selection, according to an embodiment.

Referring to FIG. 3, The LTE frequency prioritization is based on NR support provided by corresponding LTE frequencies and an ENDC capability of the UE 200, according to embodiments. In operation 301, a prioritized MRU LTE frequency list (depicted in the Table 6) is scanned. Initially, the processor 201 of the UE 200 creates the updated MRU LTE frequency list (depicted in the Table 5). Once the updated MRU LTE frequency list is created, the processor 201 may prioritize the MRU LTE frequencies with NR support (40620 and 8473) that match the ENDC capability of the UE 200, over MRU LTE frequencies not supporting NR or MRU LTE frequencies with NR support not matching the ENDC capability of the UE 200 (8665 and 10140). The processor 201 may scan the prioritized MRU LTE frequency list to camp on LTE cells at the LTE frequencies of associated LTE bands matching the ENDC capability of the UE 200.

In operation 302, it is determined whether the UE 200 is able to detect a suitable LTE cell. The suitability of the detected LTE cell may be determined based on the detected LTE cell satisfying 3GPP defined cell selection criteria. Further, the suitability of the LTE cell may refer to enablement of the LTE frequencies of specific LTE bands in the MRU LTE frequency list, where NR bands that are supported by the enabled LTE frequencies match the ENDC capability of the UE 200. The LTE cells in which the LTE frequencies 40620 and 8473 are enabled may be considered as suitable LTE cells. At operation 303, the UE 200 camps on the suitable LTE cell. Once the UE 200 camps on the suitable LTE cell, For example, as shown in the Table 5 or Table 6, the processor 201 may update the "Supported NR bands" field of the prioritized MRU LTE frequency list based on a BandListENDC, a PLMN-InfoList, and an NR-BandList, broadcasted as system information pertaining to the suitable LTE cell where the UE 200 camps on.

If it is determined that the UE 200 is not able to detect any suitable LTE cell in operation 302, the UE 200 may initiate a full band scan in operation 304. When the processor 201 has completed scanning the prioritized MRU LTE frequency list, and the UE 200 has not been able to camp on any of the LTE frequencies, the processor 201 may initiate a full band scan for LTE frequencies of configured LTE bands. The configured LTE bands may be stored in the memory 203 of the UE 200. The configured LTE bands may be prioritized The above-described operations and sub-operations in the method 300 may be performed in the order presented, in a different order, or simultaneously, according to embodiments. Further, in some embodiments, some operations or sub-operations described above in the method 300 may be omitted.

In an embodiment, the processor 201 may compute a peak throughput for each of the combinations of LTE bands and NR bands that are supported by the UE 200. The processor 201 may store the computed values of the peak throughputs in the memory 203. Referring to the ENDC capability of the UE 200 as depicted in the Table 4, the combinations of the LTE bands and the NR bands supported by the UE 200 are (L-1, N-1), (L-1, N-3), (L-1, N-4), (L-2, N-1) and (L-2, N-2). The processor 201 may compute a peak throughput pertaining to each of these five combinations, and create a peak throughput database to store information about the peak throughputs. In an embodiment, the peak throughputs may be computed periodically. If the UE 200 is able to detect at least one LTE cell supporting at least two of the combinations of LTE bands and NR bands, the processor 201 may prioritize the at least two of the combinations of LTE and NR bands based on the peak throughputs of the at least two combinations of LTE and NR bands.

In an embodiment, the processor 201 may dynamically update the peak throughput database based on peak throughput computations. The computations of the peak throughput may be performed based on an available operator bandwidth corresponding to each of the combinations of LTE and NR bands.

Figure 4:
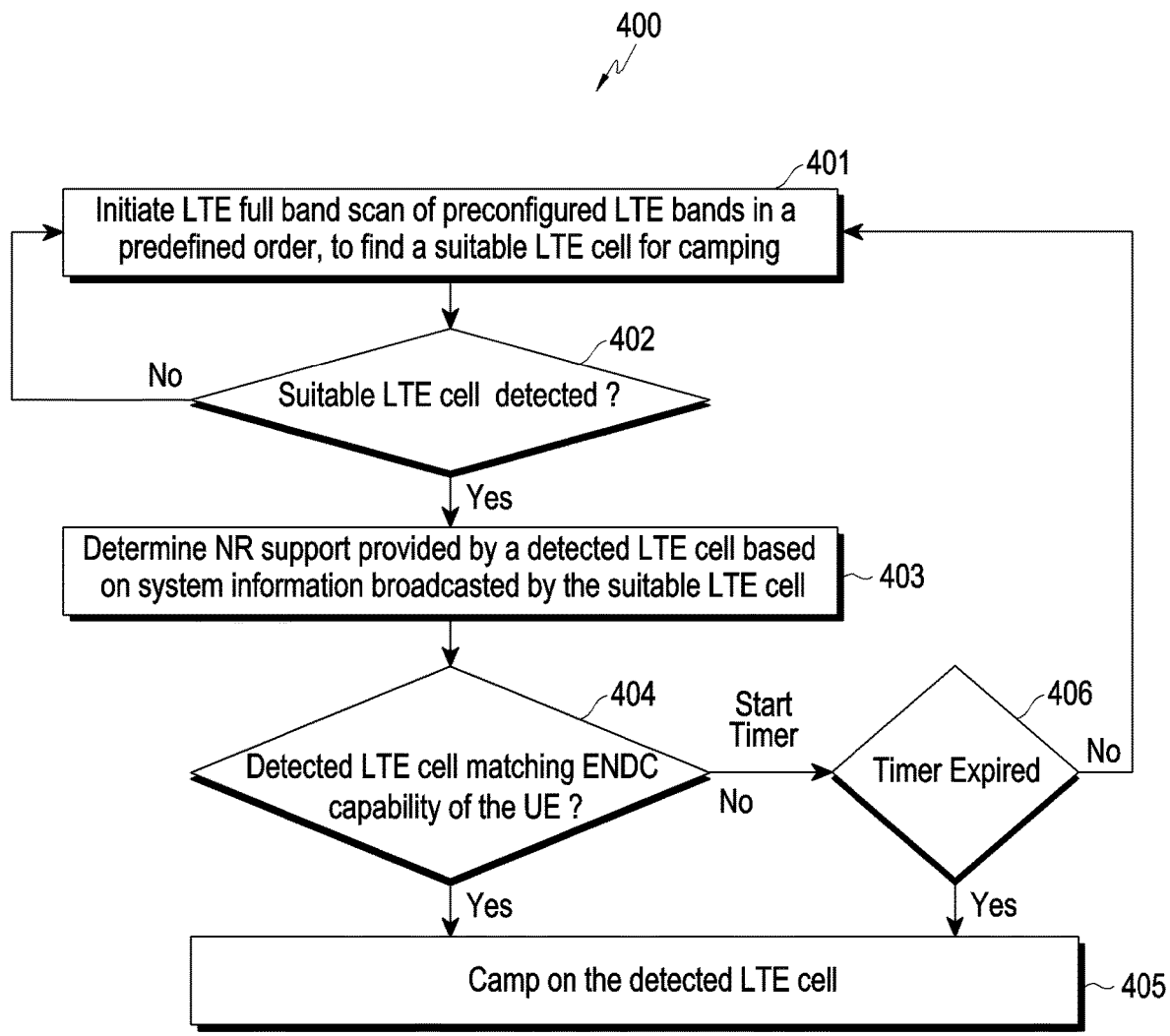
FIG. 4 is a flowchart illustrating prioritization of LTE cells detected after a full band scan, according to embodiments.

FIG. 4 illustrates a method (400) for prioritization of LTE cells detected after a full band scan, according to embodiments.

Referring to FIG. 4, The prioritization of the detected LTE cells is based on NR bands supported by the detected LTE cells and the ENDC capability of the UE 200, according to embodiments. When the UE 200 is not able to detect a suitable LTE cell for camping at any of the LTE frequencies in the prioritized MRU LTE frequency list, the UE 200 may initiate an LTE full band scan in operation 401. The LTE full band scan involves the UE 200 scanning preconfigured LTE bands in a predefined order to find a suitable LTE cell for camping. In an embodiment, the LTE bands that are preconfigured for a full band scan, and the predefined order for the scanning may be stored in the memory 203 of the UE 200.

In operation 402, it is determined whether the UE 200 has been able to detect a suitable LTE cell for camping. The suitability of the detected LTE cell may be determined based on the detected LTE cell satisfying 3GPP defined cell selection criteria. Further, the suitability may be accessed based on the LTE cells supporting the LTE bands, or LTE frequencies in the LTE bands, which are supported (or configured) by the UE 200. If the UE 200 is not able to detect a suitable LTE cell, the full band scan may continue till the UE 200 is able to detect a suitable LTE cell. Once the UE 200 detects a suitable LTE cell, In operation 403, the UE 200 may receive at least one of a BandListENDC, a PLMN-InfoList, and an NR-BandList from system information broadcasted by the suitable LTE cell. Based on contents in the BandListENDC, PLMN-InfoList, and NR-BandList, the UE 200 may determine NR bands supported by the suitable LTE cell at specific LTE bands.

In operation 404, it is determined whether the detected LTE cell supports NR, and NR bands supported by the detected LTE cell matches the ENDC capability of the UE 200.

In a first scenario, the UE 200 detects a suitable LTE cell, e.g., cell-1 that supports NR bands N-3 and N-5 at an LTE band L-2. Even though the detected LTE cell supports NR, the NR bands supported by the detected LTE cell (N-3 and N-5) does not match the ENDC capability of the UE 200. The consideration is based on the ENDC capability of the UE 200 depicted in the Table 4, in which the UE 200 supports NR bands N-1 and N-2 (not N-3 and N-5) at LTE band L-2. In this scenario, the processor 201 may start a timer. The UE 200 may attempt to detect at least one LTE cell supporting NR, while NR bands supported by the at least one LTE cell match the ENDC capability of the UE 200. The UE 200 may continue to detect at least one LTE cell till the expiry of the timer. In operation 405, it is determined whether the timer has expired. If the UE 200 is not able to detect any NR supporting LTE cell that matches the ENDC capability of the UE 200 prior to the expiry of the timer, the full band scan is abandoned and the UE 200 camps on cell-1 in operation 406. However, if the UE 200 is able to detect a suitable LTE cell prior to the expiry of the timer, while the LTE cell supports the LTE bands (L-1, L-2, L-3 and L-4 as shown in the Table 4), the UE 200 may read the BandListENDC, the PLMN-InfoList, and the NR-BandList in the system information broadcasted by the detected suitable LTE cell, in order to determine the NR support of the detected suitable LTE cell (operation 403).

In a second scenario, the UE 200 detects a suitable LTE cell, e.g., cell-2 that supports NR bands N-1 and N-2 at LTE band L-2. In this scenario, it is determined (in operation 404) that the detected LTE cell supports NR, and one of the NR bands (N-1) matches the ENDC capability of the UE 200, i.e., a combination of the LTE band L-2 and the NR band N-1. The consideration is based on the ENDC capability of the UE 200 depicted in the Table 4. In operation 406, the UE 200 camps on the detected LTE cell supporting NR bands that are supported by the UE 200 based on the ENDC capability of the UE 200. Once the UE 200 camps on the suitable LTE cell, the processor 201 may update the "Supported NR Bands" field of the MRU LTE frequency list based on the NR support of the suitable LTE cell (cell-2) as indicated in at least one of the BandListENDC, the PLMN-InfoList, and the NR-BandList, broadcasted in the system information of the suitable LTE cell.

In case the UE 200 is able to detect (in operation 404) at least one suitable LTE cell supporting NR, and NR bands supported by the at least one suitable LTE cell at specific LTE bands matches multiple combinations of LTE bands and NR bands based on the ENDC capability of the UE 201 in operation 404, the processor 201 may prioritize the combinations of the LTE bands and the NR bands based on peak throughputs of the combinations of the LTE bands and the NR bands. For example, if at least one suitable LTE cell supports the NR bands N-1 and N-4 at the LTE band L-1 and the NR band N-2 at the LTE band L-2, the processor 201 may check the peak throughput of each of the combinations (L-1, N-1), (L-1, N-4) and (L-2, N-2), and prioritize the combinations of the LTE bands and the NR bands for camping (in operation 405) based on the peak throughput of each of the combinations.

If peak throughputs of at least two combinations with different LTE bands are same, a higher priority is allocated to the combination with the LTE band supporting a greater number of NR bands. In an example, if the peak throughputs of the two combinations (L-1, N-4) and (L-2, N-2) are same, the higher priority is allocated to the combination (L-1, N-4). Here, the LTE bands in the two combinations are different, i.e., L-1 and L-2. The number of NR bands supported at the LTE band L-1 is three (N-1, N-3, N-4) whereas the number of NR bands supported at the LTE band L-2 is two (N-1, N-2). Therefore, the priority of the combination (L-1, N-4) is higher than the priority of the combination (L-2, N-2).

A following Table 7 depicts an example the ENDC capability of the UE 200.

TABLE 7

| LTE Band | Supported NR Bands |
| --- | --- |
| L-1 | N-260, N-3, N-4 |
| L-2 | N-1, N-2 |
| L-3 | N-2, N-3 |
| L-4 | N/A |

For example, if the UE 200 detects at least one suitable LTE cell supporting NR bands N-260 and N-4 at an LTE band L-1, an NR band N-2 at an LTE band L-2, and an NR band N-3 at an LTE band L-3, the processor 201 may check a peak throughput of each of the combinations (L-1, N-260), (L-1, N-4), (L-2, N-2) and (L-3, N-3). The processor 201 may prioritize the combinations of the LTE and NR bands for camping (in operation 405) based on peak throughputs of the combinations.

If peak throughputs of at least two combinations with the same LTE bands are the same, there are two criteria for allocating a higher priority. In the first criterion, the higher priority may be allocated to a combination with an NR band belonging to a Frequency Range-2 (FR-2) in place of a combination with an NR band belonging to a Frequency Range-1 (FR-1). For example, if the peak throughputs of the two combinations (L-1, N-260) and (L-1, N-4) are same, the higher priority is allocated to the combination (L-1, N-260). Here, the LTE band in the two combinations is same, i.e., L-1. However, the NR band N-260 belongs to the FR-2, while the NR band N-4 belongs to the FR-1. Therefore, the priority of the combination (L-1, N-260) is higher than the priority of the combination (L-1, N-4).

In the second criterion, the higher priority is allocated to a combination with an NR band being a Time Division Duplex (TDD) band in place of a combination with an NR band being a Frequency Division Duplex (FDD) band. For example, when the peak throughput values of the two combinations (L-1, N-3) and (L-1, N-4) are the same, both the NR band N-3 and the NR band N-4 may belong to the FR-1, and the NR band N-3 may be a TDD band and the NR band N-4 may be a FDD band. In this scenario, the higher priority may be allocated to the combination (L-1, N-3). Here, the LTE band in the two combinations is same, i.e., L-1, and the NR band N-3 is a TDD band, while the NR band N-4 is an FDD band. Therefore, the priority of the combination (L-1, N-3) is higher than the priority of the combination (L-1, N-4).

If peak throughputs of at least two combinations with different LTE bands are the same, the number of NR bands supported by each of the combinations is the same, the NR bands in each of the combinations belongs to the same FR, i.e., FR-1 or FR-2, and the NR bands in each of the combinations are either TDD bands or FDD bands, then the processor 201 may allocate a higher priority to the combination based on 3GPP defined criteria for allocation of priority for cell selection. In an example, if the peak throughputs of the two combinations (L-2, N-2) and (L-3, N-3) are the same, the higher priority may be allocated to one of the combinations based on 3GPP defined criteria. Here, the LTE bands in the two combinations are different, i.e., L-2 and L-3. The number of NR bands supported at the LTE band L-2 is two (N-1 and N-2) and the number of NR bands supported at the LTE band L-3 is two (N-2 and N-3). The NR bands N-1, N-2 and N-3, belong to the FR-1. The NR bands N-1, N-2 and N-3 are either TDD bands or FDD bands.

If peak throughputs of at least two combinations with the same LTE bands are the same, the NR bands in each of the combinations belong to the same FR, i.e., FR-1 or FR-2, and the NR bands in each of the combinations are either TDD bands or FDD bands, then the processor 201 may allocate a higher priority to the combination based on 3GPP defined criteria for allocation of priority for cell selection. In an example, if the peak throughputs of the two combinations (L-1, N-3) and (L-1, N-4) are the same, the higher priority may be allocated to one of the combinations based on 3GPP defined criteria. It can be noted that, the LTE band in both of the combinations is the same, i.e., L-1. The NR bands in the combinations (L-1, N-3) and (L-1, N-4), i.e., N-3 and N-4, belong to the FR-1. The NR bands N-3 and N-4 are either TDD bands or FDD bands.

The above-described operations and sub-operations in the method 400 may be performed in the order presented, in a different order, or simultaneously, according to embodiments. Further, in some embodiments, some operations or sub-operations described above in the method 400 may be omitted.

Cell Reselection

According to an embodiment an embodiment, the UE 200 can identify candidate LTE cell frequencies based on 3GPP reselection criteria. The cell reselection involves determining LTE frequencies in neighbouring LTE cells, which are satisfying reselection criteria for high/low priority neighbour LTE cell reselection, or LTE frequencies in neighbouring LTE cells having a higher rank than a serving LTE cell for equal priority neighbour cell reselection.

Figure 5:
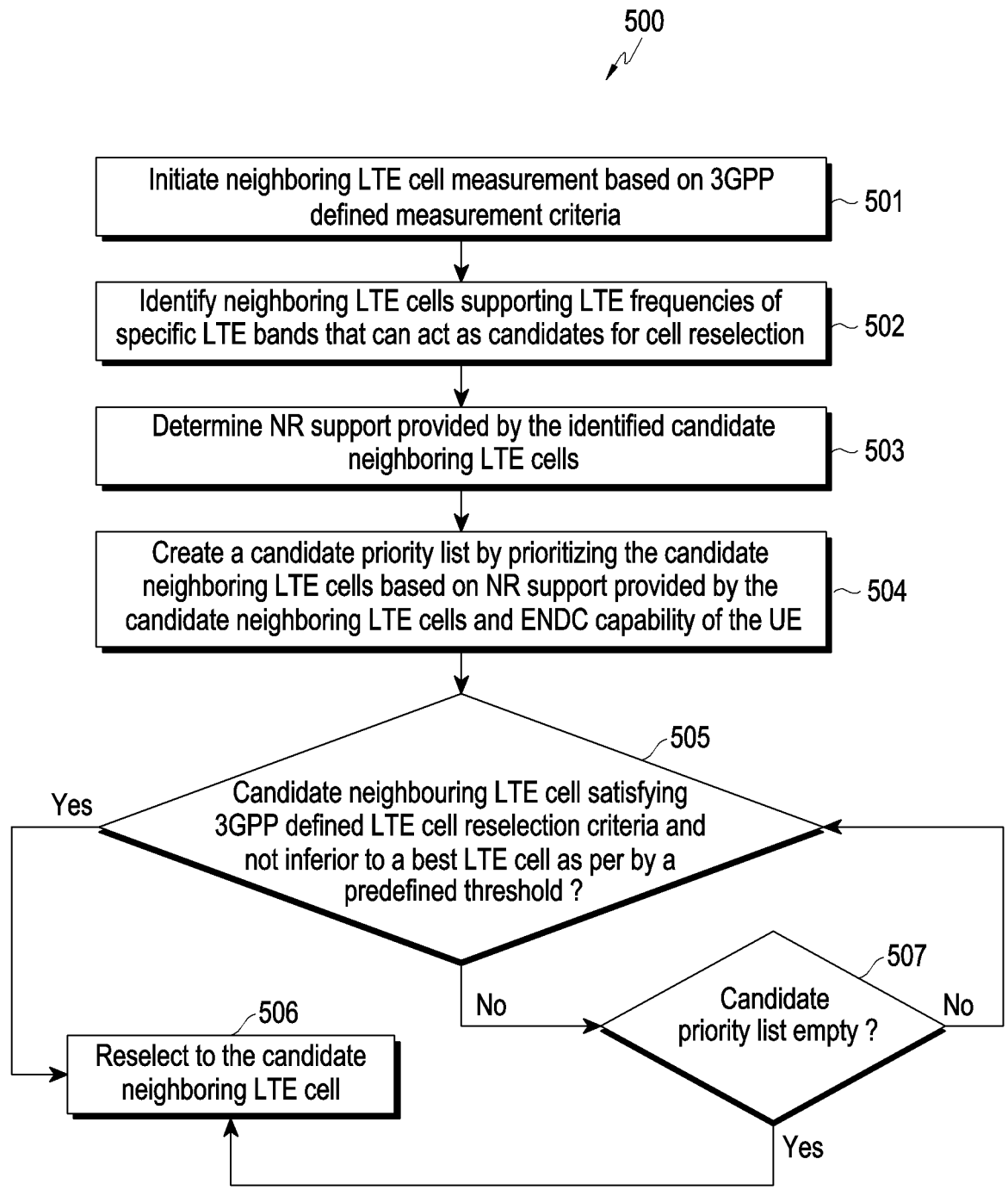
FIG. 5 is a flowchart illustrating a method for prioritizing neighbouring LTE cells for performing cell reselection, according to embodiments.

FIG. 5 illustrates a method (500) for prioritizing neighbouring LTE cells for performing cell reselection, according to an embodiment.

Referring to FIG. 5, The prioritization of the neighbouring LTE cells is based on NR bands supported by the neighbouring LTE cells and the ENDC capability of the UE 200, according to embodiments as disclosed herein. In operation 501, measurement of neighboring LTE cells based on 3GPP defined measurement criteria is initiated. In an embodiment, the UE 200 may perform the measurement in an IDLE mode. In operation 502, neighboring LTE cells that can act as candidates are identified for cell selection. The identified neighboring LTE cells may support LTE frequencies of specific LTE bands that are suitable for cell reselection based on the 3GPP defined reselection criteria.

In operation 503, NR support provided by the identified candidate neighboring LTE cells is determined. For this determination of NR support, the UE 200 may receive at least one of a BandListENDC, a PLMN-InfoList, and an NR-BandList, broadcasted in system information pertaining to each of the candidate neighboring LTE cells, according to an embodiment. In an example, four neighboring LTE cells may have been identified as candidates for cell resection, and the UE 200 may determine the NR support provided by the four candidate neighboring LTE cells. A following Table 8 depicts an example of the neighboring LTE cells with cell Identities (IDs) identified as candidates for cell reselection. The Table 8 also indicates the NR support provided by the candidate neighboring LTE cells.

TABLE 8

| Index | Cell ID | Supported NR bands |
| --- | --- | --- |
| 1 | 3 (L-3) | N-1 |
| 2 | 1 (L-1) | N-260, N-2, N-5 |
| 3 | 4 (L-4) | N-2, N-3 |
| 4 | 2 (L-2) | N-2, N-6 |

As depicted in the Table 8, cell IDs of the neighboring LTE cells identified as candidates for cell reselection are 3, 1, 4 and 2, respectively. The LTE cell with a cell ID 3 supports an NR band N-1 at an LTE band L-3. The LTE cell with a cell ID 1 supports NR bands N-260, N-2 and N-5 at an LTE band L-3. The LTE cell with a cell ID 4 supports NR bands N-2 and N-3 at an LTE band L-4. The LTE cell with a cell ID 2 supports NR bands N-2 and N-6 at an LTE band L-2. For the sake of simplicity, NR support for a single LTE cell is considered for each candidate neighboring LTE cell.

The priorities of the candidate neighboring LTE cells in the Table 8 are based on 3GPP cell reselection criteria. Therefore, based on the priorities exemplified in the Table 8, that is, in the order of the index, the UE 200 is likely to select the candidate neighboring LTE cell with the cell ID 3 for cell reselection. The NR support provided by the selected candidate neighboring LTE cell does not match the ENDC capability of the UE 200. This is because the selected candidate neighboring LTE cell supports the NR band N-1 at the LTE band L-3, while the UE 200 supports the NR bands N-2 and N-3 at the LTE band L-3 (based on the ENDC capability of the UE 200 exemplified in Table 7).

In operation 504, a candidate priority list is created by prioritizing the candidate neighbouring LTE cells based on the NR support provided by the candidate neighbouring LTE cells and the ENDC capability of the UE 200. Considering the ENDC capability of the UE 200 as defined in Table 7, the candidate priority list may be created by being sorted as shown in a following Table 9.

TABLE 9

| Priority | Cell ID | Supported NR bands |
| --- | --- | --- |
| 1 | 1 (L-1) | N-260, N-2, N-5 |
| 2 | 2 (L-2) | N-2, N-6 |

TABLE 9-continued

| Priority | Cell ID | Supported NR bands |
|---|---|---|
| 3 | 3 (L-3) | N-1 |
| 4 | 4 (L-4) | N-2, N-3 |

As depicted in the Table 9, the candidate neighbouring LTE cells with the cell IDs 1 and 2 are prioritized over the candidate neighbouring LTE cells with cell IDs 3 and 4. This is because, even though all the candidate neighbouring LTE cells support NR, the NR bands supported by the candidate neighbouring LTE cells with the cell IDs 1 (N-260) and 2 (N-2) match the ENDC capability of the UE 200 (as exemplified in the Table 7). Further, based on the ENDC capability of the UE 200, the priority of the candidate neighbouring LTE cell with the cell ID 1 is greater than the priority of the candidate neighbouring LTE cell with the cell ID 2. This is because, the number of NR bands supported by the neighbouring LTE cell with the cell ID 1, that is, 3, is greater than the number of NR bands supported by the neighbouring LTE cell with the cell ID 2, that is, 2, and the NR band N-260 (supported by the neighbouring LTE cell with the cell ID 1) belongs to the FR-2, while the NR band N-2 (supported by the neighbouring LTE cell with cell ID 2) belongs to the FR-1. The candidate neighbouring LTE cell with the cell ID 3 is assigned with a higher priority, compared to that of the candidate neighbouring LTE cell with the cell ID 4, based on the 3GPP defined cell reselection criteria.

In operation 505, it is determined whether the candidate neighbouring LTE cells satisfy 3GPP defined LTE cell reselection criteria. The UE 200 may initially determine whether the LTE cell with the highest priority in the candidate priority list in the Table 9 satisfies the 3GPP defined LTE cell reselection criteria. If the LTE cell with the highest priority satisfies the LTE cell reselection criteria, the UE 200 determines whether the LTE cell with the highest priority is the best LTE cell available for cell reselection based on the 3GPP defined LTE cell reselection criteria. Considering the Table 8, it can be derived that all the LTE cells (with the cell IDs 1, 2, 3 and 4) satisfy the 3GPP defined LTE cell reselection criteria, and the LTE cell with the cell ID 3 is the best LTE cell available for cell reselection.

Considering the Table 8, it can be derived that the LTE cell with the highest priority, i.e., LTE cell with the cell ID 1, is not the best LTE cell. If the LTE cell with the highest priority in the candidate priority list (the LTE cell with the cell ID 1) is not the best cell, the UE 200 may determine whether the LTE cell with the highest priority is not inferior to the best LTE cell (the LTE cell with the cell ID 3) by a predefined threshold. The inferiority may be ascertained based on at least one of Quality of Service (QoS) parameters such as bandwidth, signal strength, bit error rate (BER), and so on. In an embodiment, the inferiority may be ascertained based on a signal strength, and an example value of the predefined threshold may be −20 dBm. Therefore, if the signal strength of the best LTE cell is −80 dBm, and the signal strength of the LTE cell with the highest priority is more than (better than) −100 dBm, the LTE cell with the highest priority in the candidate priority list, i.e., the LTE cell with the cell ID 1 may be reselected in operation 5506.

The predefined threshold can prevent possible ping-pong triggering of LTE cell reselection amongst different candidate neighbouring LTE cells. For example, if the UE reselects the LTE cell with the highest priority and the signal strength is −110 dBm (signal strength inferiority compared to the best LTE cell is greater than the predefined threshold is −20 dBm), the UE 200 is likely to perform cell reselection. If the UE 200 does not (or is not able to) select the appropriate candidate neighbouring LTE cell, there will be ping-pong triggering of LTE cell reselection amongst different candidate neighbouring LTE cells.

On the other hand, if the UE 200 determines that the LTE cell with the highest priority is inferior to the best LTE cell by more than the predefined threshold, it is determined, in operation 507, whether the candidate priority list is empty. If the candidate priority list is not empty, the UE 200 checks succeeding LTE cells in the candidate priority list with a lower priority. Once the UE 200 determines that the LTE cell with the highest priority (the LTE cell with the cell ID 1) is inferior to the best LTE cell by more than the predefined threshold, the UE 200 can check whether the second highest priority in the candidate priority list (i.e., the LTE cell with the cell ID 2) satisfies the 3GPP defined LTE cell reselection criteria (perform the operation 505 again). As the LTE cell with the second highest priority is not the best cell, the UE 200 can determine whether the LTE cell with the second highest priority is not inferior to the best LTE cell (the LTE cell with the cell ID 3) by the predefined threshold. If the UE 200 determines that the LTE cell with the second highest priority is inferior to the best LTE cell by more than the predefined threshold, the UE 200 may continue with the operations 505 with the subsequent (in terms of lower priority) candidate neighbouring LTE cells in the candidate priority list until the UE 200 is able to reselect to one of the neighbouring LTE cells in the candidate priority list.

Once the UE 200 reselects a neighbouring LTE cell in the candidate priority list, and if the reselected neighbouring LTE cell supports the NR bands that are supported by the UE 200 based on the ENDC capability of the UE 200 (the candidate neighbouring LTE cell with the cell ID 1 or 2), the UE 200 may attempt for a Secondary Cell Group (SCG) for one of the ENDC combinations of the LTE bands and the NR bands, e.g., (L-1, N-260) or (L-2, N-6)), which provides the maximum throughput as per the peak throughput database.

According to an alternative embodiment of LTE cell reselection, if the UE 200 is currently camped on an LTE cell with an NR support provided by the LTE cell not matching the ENDC capability of the UE 200, and if the candidate priority list (comprising the neighbouring LTE cells available for cell reselection based on 3GPP defined cell reselection criteria) does not include a single neighbouring LTE cell supporting NR bands matching the ENDC capability of the UE 200, then the UE 200 may scan and include at least one non-candidate neighbouring LTE cell in the candidate priority list for cell reselection. In an example, a following Table 10 depicts neighbouring LTE cells identified as candidates for cell reselection based on 3GPP defined cell reselection criteria.

TABLE 10

| Priority | Cell ID | Supported NR bands |
|---|---|---|
| 1 | 3 (L-3) | N-1 |
| 2 | 1 (L-1) | N-2, N-5 |
| 3 | 4 (L-4) | N-2, N-3 |
| 4 | 2 (L-2) | N-6 |

As depicted in the Table 10, the UE 200 determines that none of the candidate neighbouring LTE cells supports the NR bands that match the ENDC capability of the UE 200 (as exemplified in the Table 7). In this scenario, the UE 200 may include at least one non-candidate neighbouring LTE cell in the candidate priority list. The UE 200 may determine NR bands supported by the at least one non-candidate neighbouring LTE cell based on at least one of a BandListENDC, a PLMN-InfoList and an NR-BandList broadcasted in system information pertaining to each of the at least one non-candidate neighbouring LTE cell.

If the NR support provided by the at least one non-candidate LTE cell (NR bands supported by the at least one non-candidate LTE cell) matches the ENDC capability of the UE 200, and if the at least one non-candidate neighbouring LTE cell is superior to a serving LTE cell by a preconfigured threshold, the UE 200 may reselect one of the at least one non-candidate neighbouring LTE cell. The superiority may be ascertained based on at least one of QoS parameters such as bandwidth, signal strength, BER, and so on. In an embodiment, the superiority may be ascertained based on a signal strength, and the predefined threshold may be −10 dBm. Therefore, if the signal strength of the at least one non-candidate neighbouring LTE cell is −90 dBm, and the signal strength of the serving LTE cell is less than −100 dBm, the UE 200 may reselect one of the at least one non-candidate neighbouring LTE cell.

It is to be noted that the reselected LTE cell amongst the at least one non-candidate neighbouring LTE cell has the highest peak throughput as per the peak throughput database.

The above-described operations and sub-operations in the flowchart 500 may be performed in the order presented, in a different order, or simultaneously, according to embodiments. Further, in some embodiments, some operations or sub-operations described above in the flowchart 500 may be omitted.

Cell Redirection

When the UE 200 receives, through the communication interface 202, a cell redirection command from a wireless network (either to redirect from a particular RAT to LTE, redirect from NR Standalone to LTE, redirect from one frequency to another within LTE, or other similar cases), the UE 200 may not receive a target LTE frequency (to camp on) from the LTE network. If the UE 200 does not receive the target LTE frequency from the LTE network, the UE 200 may perform cell selection (LTE frequency may be selected from amongst prioritized MRU LTE frequencies or from amongst LTE frequencies in specific LTE bands supported by prioritized LTE cells that are detected as suitable for camping after performing a Full Band Scan). The UE 200 prioritizes LTE frequencies supporting NR bands matching the ENDC capability of the UE 200, which is determined using a BandListENDC, a PLMN-InfoList, and an NR-BandList, pertaining to the LTE frequencies.

If the UE 200 receives the target LTE frequency from the wireless network, the UE 200 may identify candidate LTE cells that supports the target LTE frequency. The UE 200 may read the Ws BandListENDC, PLMN-InfoList, and NR-BandList present in the SystemInformationBlockType26A messages broadcasted by the LTE cells that support the target LTE frequency. This allows the UE to determine the NR support capability of the LTE cells supporting the target LTE frequency. A following Table 10 depicts example LTE cells, along with respective cell IDs and NR bands supported by the LTE cells, which are identified as candidate LTE cells that support the target LTE frequency redirected by the wireless network based on 3GPP defined criteria for cell redirection (reselection).

TABLE 11

| Index | Cell ID | Supported NR bands |
|---|---|---|
| 1 | 3 (L-1) | N-1 |
| 2 | 1 (L-1) | N-260, N-2, N-5 |
| 3 | 4 (L-1) | N/A |
| 4 | 2 (L-1) | N-3, N-6 |

As depicted in table-11, the target LTE frequency falls in the L-1 LTE band. The UE 200 can prioritize the LTE cells that are supporting the target LTE frequency. The prioritization is based on the LTE cells supporting at least one NR band matching the ENDC capability of the UE 200 (table-7). The UE 200 creates a candidate priority list comprising the candidate LTE cells supporting the target LTE frequency based on the ENDC capability of the UE 200 and the peak throughput offered by each of the combinations of LTE and NR bands supported by the ENDC capability of the UE 200. The following table (Table 12) depicts the candidate priority list.

TABLE 12

| Index | Cell ID | Supported NR bands |
|---|---|---|
| 1 | 1 (L-1) | N-260, N-2, N-5 |
| 2 | 2 (L-1) | N-3, N-6 |
| 3 | 3 (L-1) | N-1 |
| 4 | 4 (L-1) | N/A |

As depicted in the Table 12, candidate LTE cells supporting a target LTE frequency with cell IDs 1 and 2 are prioritized over candidate LTE cells supporting the target LTE frequency with cell IDs 3 and 4. This is because, NR bands supported by the candidate LTE cells supporting the target LTE frequency with the cell IDs 1 (N-260) and 2 (N-3) match the ENDC capability of the UE 200 (as exemplified in the Table 7). Further, based on the ENDC capability of the UE 200, the priority of the candidate LTE cell supporting the target LTE frequency with the cell ID 1 is greater than the priority of the candidate LTE cell supporting the target LTE frequency with the cell ID 2. This is because the NR band N-260 (supported by the candidate LTE cell supporting the target LTE frequency with the cell ID 1) belongs to the FR-2, while the NR band N-3 (supported by the candidate LTE cell supporting the target LTE frequency with cell ID 2) belongs to the FR-1. The candidate LTE cell supporting the target LTE frequency with the cell ID 3 is assigned a higher priority, compared to that of the candidate LTE cell supporting the target LTE frequency with the cell ID 4, based on the 3GPP defined criteria for cell redirection (reselection).

The UE 200 may check whether the LTE cells supporting the target LTE frequency in the candidate priority list satisfy the 3GPP defined cell redirection (reselection) criteria. The UE 200 may initiate the check in an order of the higher priority to the lower priority. If the UE 200 determines that a candidate LTE cell supporting the target LTE frequency is the best LTE cell in terms of satisfying the 3GPP defined cell redirection (reselection) criteria or not inferior to the best LTE cell by the predefined threshold set for LTE cell reselection (redirection), the UE 200 may be redirected to the candidate LTE cell supporting the target LTE frequency.

Cell Handover

The UE 200 may maintain a neighbour list database, which includes fields including at least one of Cell Global Identity (CGI), Physical Cell Identity (PCI), Evolved-Universal Terrestrial Radio Access (E-UTRA) Absolute Radio Frequency Channel Number (EARFCN), PLMN, supported NR bands, and time-created. A following Table 13 demonstrates an example of neighbour list database maintained by the UE 200.

TABLE 13

| Index | CGI | PCI | EARFCN | PLMN | Supported NR bands | Time Created |
|---|---|---|---|---|---|---|
| 1 | 231 | 3 | 8665 (L-3) | 312-001 | N-1 | 16/06/2020-21.39 |
| 2 | 432 | 1 | 40620 (L-1) | 310-002 | N-260, N-2, N-5 | 16/06/2020-22.09 |
| 3 | 786 | 4 | 10140 (L-4) | 310-003 | N-2, N-3 | 16/06/2020-20.42 |
| 4 | 591 | 2 | 8473 (L-2) | 311-004 | N-2, N-6 | 16/06/2020-21.19 |

The neighbour list database maintained by UE 200 includes NR support provided by the neighbouring LTE cells. The UE 200 may receive system information broadcasted by the neighbouring LTE cells. The UE 200 may receive at least one of Ws BandListENDC, PLMN-InfoList, and NR-BandList present in a SystemInformationBlockType26A message broadcasted by each of the neighbouring LTE cells. This allows the UE to determine the NR support capability of the neighbouring LTE cells. The neighbour list database is dynamically updated during measurement evaluation of the neighbour cells for measurement events configured by the wireless network. In an embodiment, old entries in the Table 13 may be discarded after a predefined configured time period has elapsed.

Figure 6A:
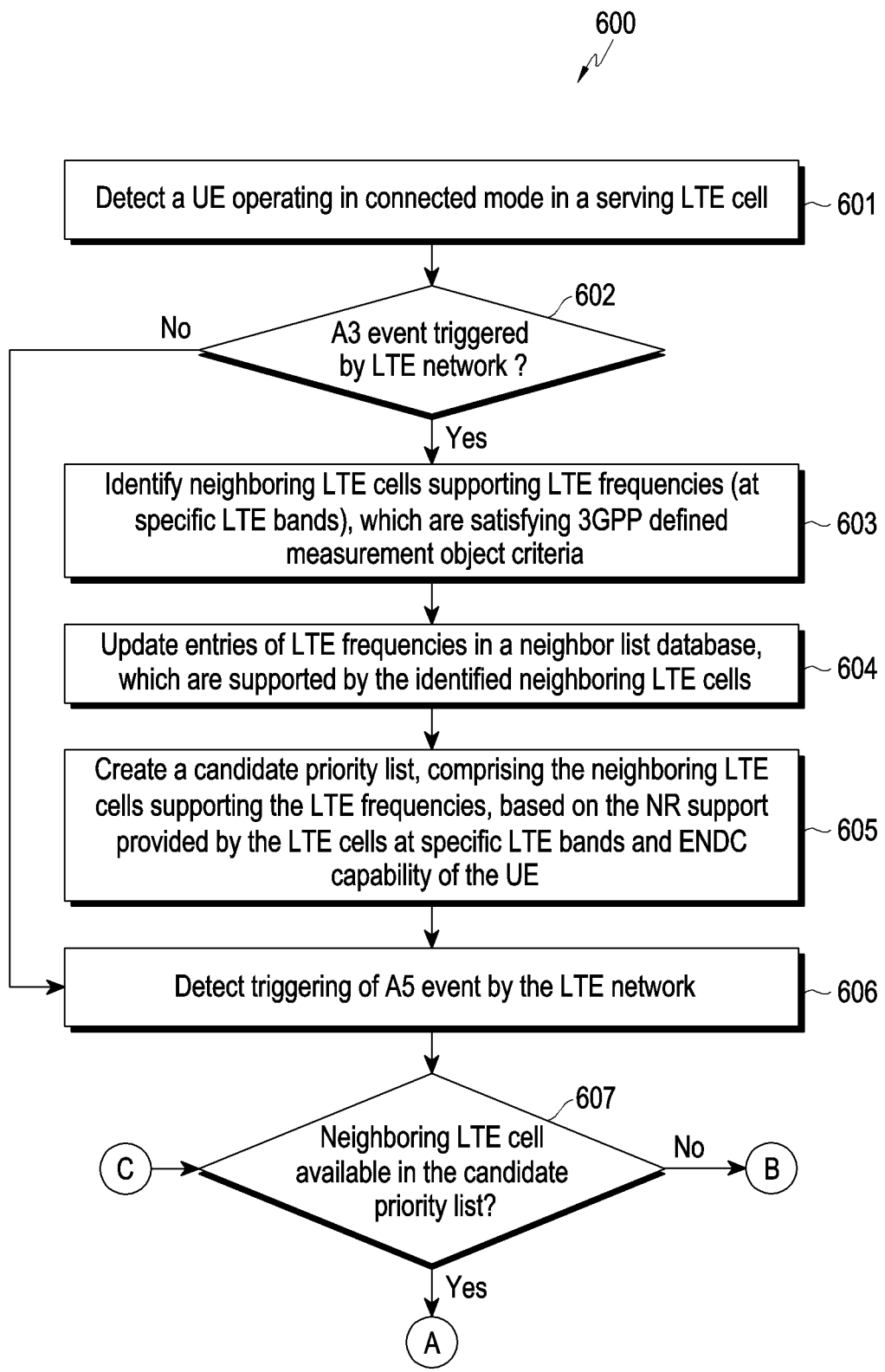
FIGS. 6A-6C are flowcharts illustrating a method for prioritizing neighbouring LTE cells for sending measurement reports pertaining to neighbouring LTE cells to an LTE network, according to embodiments.
Figure 6B:
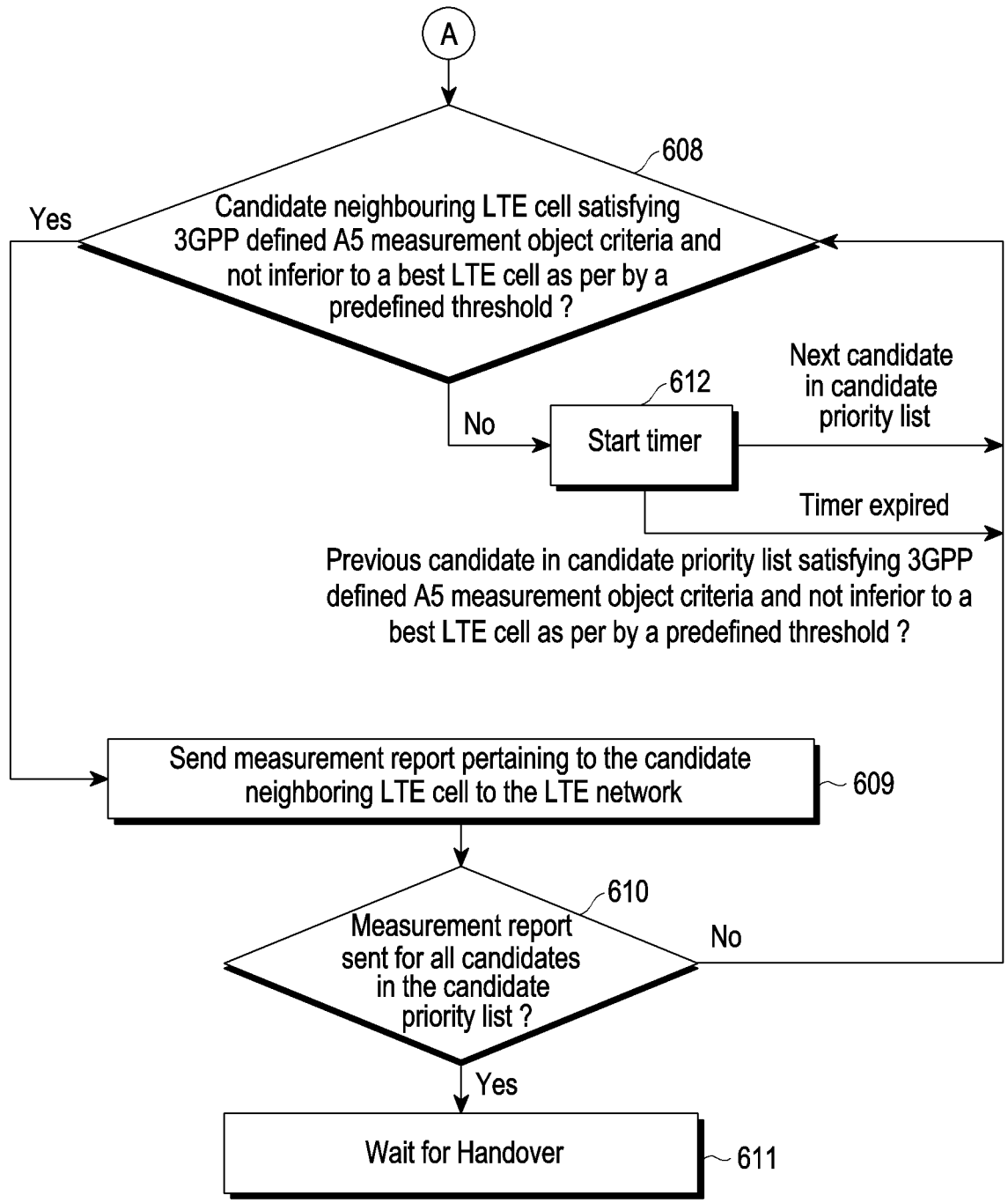
Figure 6C:
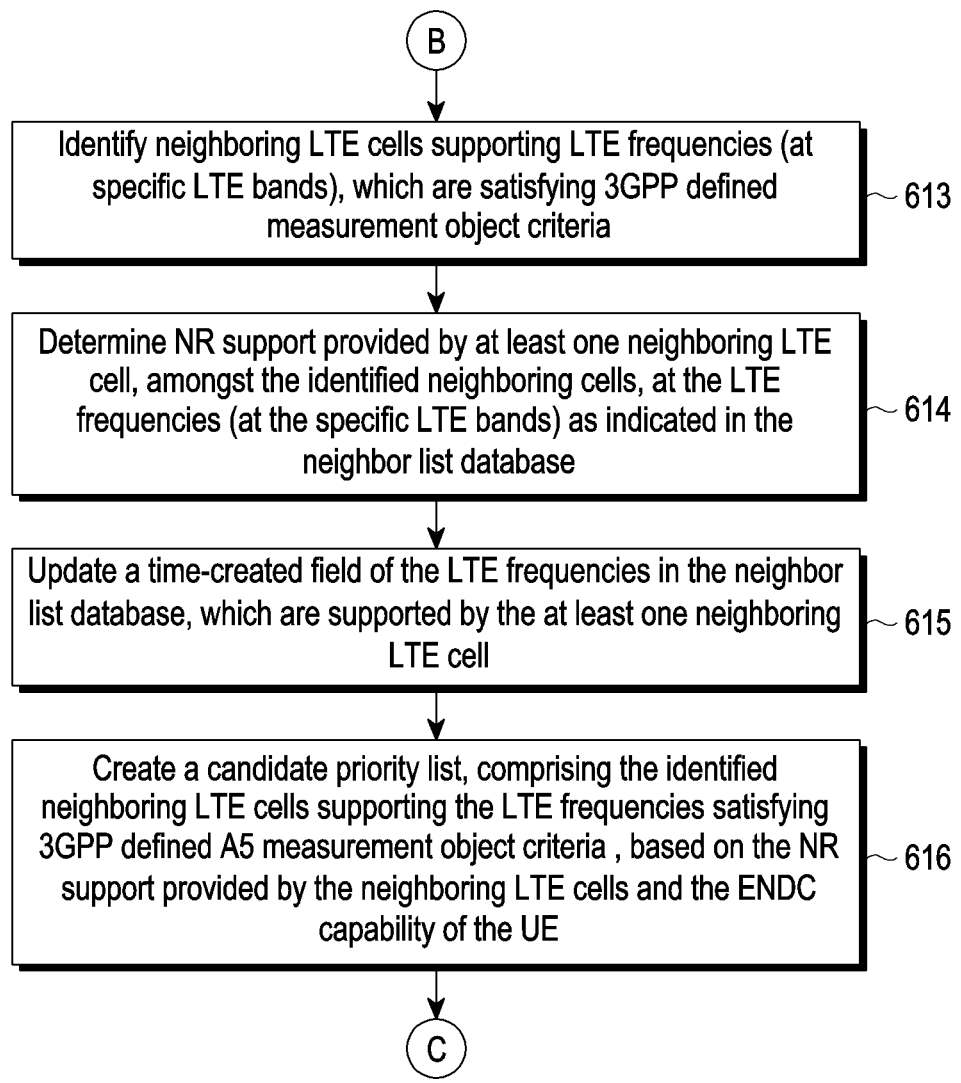

FIGS. 6A-6C illustrate a method (600) for prioritizing neighbouring LTE cells for sending measurement reports pertaining to the neighbouring LTE cells to an LTE network, according to an embodiment.

Referring to FIG. 6A, here, the prioritization of the neighbouring LTE cells may be based on NR bands supported by the neighbouring LTE cells and the ENDC capability of the UE 200, according to embodiments. In operation 601, it is detected that the UE 200 is operating in a connected mode in an LTE cell (serving LTE cell). In operation 602, it is determined whether an A3 event related to handover in 3GPP standard is triggered by the LTE network. If the A3 event is triggered by the LTE network, the UE 200 can identify, in operation 603, neighbouring LTE cells that support LTE frequencies (at specific LTE bands) which satisfy 3GPP defined measurement object criteria.

The UE 200 may determine NR support provided by the identified neighbouring LTE cells at the LTE frequencies by receiving at least one of a BandListENDC, a PLMN-Info-List, and an NR-BandList in system information broadcasted by each of the identified neighbouring LTE cells. In an embodiment, the system information broadcasted by each of the identified LTE cells may be received during a connected mode either in an interleaved manner or using an idle transmitter or receiver antennas of the UE 200.

In operation 604, entries of the LTE frequencies in the neighbour list database, supported by the identified neighbouring LTE cells, are updated. In operation 605, the UE 200 creates a candidate priority list, comprising the neighboring LTE cells supporting the LTE frequencies, based on the NR support provided by the LTE cells at specific LTE bands. The following is an example Table 14 indicating a candidate priority list.

TABLE 14

| Priority | Cell ID | Supported NR bands |
|---|---|---|
| 1 | 1 (L-1) | N-260, N-2, N-5 |
| 2 | 2 (L-2) | N-2, N-6 |
| 3 | 3 (L-3) | N-1 |
| 4 | 4 (L-4) | N-2, N-3 |

According to the Table 13 and Table 14, neighboring LTE cells with cell IDs 1, 2, 3 and 4 support LTE frequencies 40620 at an LTE band L-1, 8473 at an LTE band L-2, 8665 at an LTE band L-3, and 10140 at an LTE band L-4, respectively, as shown in the Table 3 above. The neighboring LTE cells with the cell IDs 1, 2, 3 and 4, detected as satisfying the 3GPP defined measurement object criteria (in operation 603), are prioritized to create a candidate priority list.

The prioritization of the neighboring LTE cells may be based on NR bands supported by the neighbouring LTE cells and the ENDC capability of the UE 200. The neighboring LTE cells with the cell IDs 1 and 2 are prioritized over the neighboring LTE cells with the cell IDs 3 and 4 because NR bands supported by the neighboring LTE cells with the cell IDs 1 (N-260) and 2 (N-2) match the ENDC capability of the UE 200 (as exemplified in the Table 7). Further, based on the ENDC capability of the UE 200, the priority of the neighboring LTE cell with the cell ID 1 is higher than the priority of the neighboring LTE cell with the cell ID 2 because the NR band N-260 (supported by the neighboring LTE cell with the cell ID 1) belongs to the FR-2 while the NR band N-3 (supported by the neighboring LTE cell with the cell ID 2) belongs to the FR-1. The neighboring LTE cell with the cell ID 3 is assigned a higher priority, compared to that of the neighboring LTE cell with the cell ID 4, based on the 3GPP defined measurement object criteria.

In operation 606, the UE 200 detects triggering of an A5 event, related to handover in 3GPP standard, by the LTE network. Once the LTE network configures a measurement object for the A5 event, the UE 200 may check, in operation 607, whether there is any neighboring LTE cell in the candidate priority list. In case that the A3 event is triggered by the LTE network (determined in operation 602), operation 607 is redundant. This is because, if the A3 event is triggered, the candidate priority list including neighboring LTE cells satisfying the 3GPP defined measurement object criteria is already created (operation 605), and the neighbouring LTE cells are prioritized based on the NR support provided by the neighboring LTE cells, the ENDC capability of the UE, and the peak throughputs of the LTE frequencies supported by the neighboring LTE cells.

Referring to FIG. 6B, if availability of the candidate priority list is detected, the UE 200 checks, in operation 608, if the candidate neighboring LTE cells in the candidate priority list supporting the LTE frequencies satisfy the 3GPP defined measurement object criteria of A5 event and are not inferior to the best neighbouring LTE cell in the candidate priority list by more than a predefined threshold. The UE 200 may initiate checking from the neighbouring LTE cell with the highest priority, i.e., the neighbouring LTE cell with the cell ID 1, and proceed with the neighbouring LTE cells with successive lower priorities. The UE 200 may proceeds with a neighbouring LTE cell with a successive lower priority, if the preceding neighbouring LTE cell with a higher priority does not satisfy the 3GPP defined A5 measurement object criteria and is inferior to the best neighbouring LTE cell in the candidate priority list by more than the predefined threshold.

If the UE 200 detects that a neighboring LTE cell (the LTE cell with the cell ID 1, for example) in the candidate priority list satisfies the 3GPP defined A5 measurement object criteria, it is detected whether the neighboring LTE cell is the best LTE cell in terms of satisfying the 3GPP defined measurement object criteria of A5 event or is not inferior to the best LTE cell by the predefined threshold. In an embodiment, the inferiority may be ascertained based on a signal strength, and the predefined threshold may be set as −30 dBm. Therefore, if the signal strength of the best LTE cell satisfying the 3GPP defined measurement object criteria of A5 event is −50 dBm, and if the signal strength of the neighbouring LTE cell (with the cell ID 1, for example) is more than (better than) −80 dBm, a measurement report for the candidate neighbouring LTE cell (with the cell ID 1, for example) may be sent in operation 609.

Thereafter, the UE 200 may check whether the succeeding neighbouring LTE cell with a lower priority (the LTE cell with the cell ID 2, for example) in the candidate priority list satisfies the 3GPP defined measurement object criteria of A5 event ($1^{st}$ condition), and is not inferior to the best LTE cell by the predefined threshold (if the LTE cell with cell the ID 2 is not the best cell in terms of satisfying the 3GPP defined measurement object criteria of A5 event) ($2^{nd}$ condition). The UE 200 may send measurement reports to the LTE network for all the candidate neighbouring LTE cells in the candidate priority list sequentially. The UE 200 may determine, in operation 610, whether the measurement reports pertaining to all candidate neighbouring LTE cells in the candidate priority list have been sent to the LTE network, after sending a measurement report pertaining to each candidate neighbouring LTE cell in the candidate priority list. In case that the LTE network has not triggered a handover and the UE 200 has sent the measurement reports pertaining to all the neighbouring LTE cells in the LTE network, and the handover is not triggered by the LTE network, the UE 200 may wait for triggering of a handover by the LTE network (operation 611).

According to an embodiment, if a higher priority neighboring LTE cell in the candidate priority list (the LTE cell with the cell ID 1, for example) does not satisfy the 3GPP defined measurement object criteria of A5 event, the UE 200, in operation 612, starts a timer. The timer may be configured to expire after a predefined time interval. Meanwhile, the UE 200 may check whether a succeeding neighbouring LTE cell with a lower priority (the LTE cell with the cell ID 2, for example) in the candidate priority list satisfies the 3GPP defined A5 measurement object criteria ($1^{st}$ condition), and is not inferior to the best LTE cell by the predefined threshold (if the LTE cell with the cell ID 2 is not the best cell in terms of satisfying the 3GPP defined measurement object criteria of A5 event) ($2^{nd}$ condition). The UE 200 may send a measurement report to the LTE network for the succeeding neighbouring LTE cell with a lower priority (the LTE cell with the cell ID 2, for example) if both the $1^{st}$ and the $2^{nd}$ conditions are satisfied.

After the expiry of the timer, the UE 200 may determine whether the higher priority neighboring LTE cell (the LTE cell with the cell ID 1, for example) satisfies the $1^{st}$ and the $2^{nd}$ conditions. If both the conditions are satisfied, the UE 200 may send a measurement report to the LTE network for the high priority neighbouring LTE cell (the LTE cell with the cell ID 1, for example).

In operation 607, if it is detected that there are no neighboring LTE cells in the candidate priority list or if a candidate priority list is not available, referring to FIG. 6C, the UE 200 may identify, in operation 613, neighbouring LTE cells that support LTE frequencies (at specific LTE bands), which satisfy 3GPP defined measurement object criteria. This may occur if the A5 event is directly triggered by the LTE network (without the preceding A3 event). The UE 200 may check if there is an entry of the neighbouring LTE cells, identified in operation 613, in the neighbour list database (Table 13).

If the UE 200 finds at least one entry in the neighbour list database, corresponding to at least one neighbouring LTE cell (amongst the neighbouring LTE cells identified in operation 613), the UE 200 may determine, in operation 614, NR support provided by the at least one neighbouring LTE cell (amongst the neighbouring LTE cells identified in operation 613) at the LTE frequencies (at specific LTE bands) as indicated in the neighbour list database. In operation 615, the UE 200 updates a time-created field of the LTE frequencies in the neighbour list database, which are supported by the at least one neighbouring LTE cell.

Thereafter, in operation 616, the UE 200 creates a candidate priority list. At least one neighbouring LTE cell having an entry in the neighbour list database is assigned a higher priority. Amongst the neighbouring LTE cells having an entry in the neighbour list database, the neighbouring cells that support NR bands (at the LTE frequencies at specific LTE bands) matching the ENDC capability of the UE 200 are assigned higher priorities. The UE 200 may receive at least one of a BandListENDC, a PLMN-InfoList, and an NR-BandList in system information broadcasted by each of the neighbouring LTE cells (identified in operation 613) that do not have an entry in the neighbour list database. The UE 200 may determine NR support provided by the neighbouring LTE cells (identified in operation 613), which do not have an entry in the neighbour list database, based on at least one of the BandListENDC, the PLMN-InfoList, and the NR-BandList of each of the respective neighbouring LTE cells (identified in operation 613) not having an entry in the neighbour list database.

If the neighbouring LTE cells (identified in operation 613 and not having an entry in the neighbour list database) support the ENDC capability of the UE 200, the neighbouring LTE cells (identified in operation 613 and not having an entry in the neighbour list database) are allocated a higher priority in the candidate priority list, compared to the at least one neighbouring LTE cell having an entry in the neighbour list database but not supporting the ENDC capability of the UE 200. Similarly, the neighbouring LTE cells (identified in operation 613 and not having an entry in the neighbour list database) not supporting the ENDC capability of the UE 200 are allocated a lower priority in the candidate priority list.

The UE 200 may allocate a priority to the at least one neighbouring LTE cell (having an entry in the neighbour list database) not supporting the ENDC capability of the UE 200, and the neighbouring LTE cells (identified in operation 613 and not having an entry in the neighbour list database) not supporting the ENDC capability of the UE 200, based on 3GPP defined A5 measurement object criteria. Amongst the identified candidate neighbouring LTE cells (identified in operation 613) in the candidate priority list satisfying the 3GPP defined measurement object criteria of A5 event, supporting NR bands matching the ENDC capability of the UE 200, priorities are allocated based on a peak throughput of each of the candidate neighbouring LTE cells.

Once the priority candidate list is created, the UE 200 may perform operations 607 (in affirmative), 608, 609, 610, 611 and 612, which pertain to sending measurement reports, pertaining to the candidate neighbouring LTE cells, to the LTE network based on priorities allocated to the candidate neighbouring LTE cells.

According to an alternate embodiment, if the LTE Network does not trigger the A3 event, and the A5 event is triggered directly (operation 606 after operation 602), there will be a delay incurred in sending the measurement reports of those candidate neighbouring LTE cells (identified in operation 613), supporting LTE frequencies, which are not present in the neighbour list database. The delay incurred is receiving a BandListENDC, a PLMN-InfoList, and an NR-BandList broadcasted in system information pertaining to each of those candidate neighbouring LTE cells. The delay may not be avoided as the UE 200 needs to determine the NR support provided by those candidate neighbouring LTE cells, and determine whether the NR support provided by those candidate neighbouring LTE cells match the ENDC capability of the UE 200.

Therefore, the UE 200 may be configured to initiate measuring the neighbouring LTE cells without waiting for the LTE network to trigger an A3 event. This allows the UE 200 to detect the neighbouring LTE cells satisfying the 3GPP defined measurement object criteria, update the neighbour list database, and create a candidate priority list of candidate neighbouring LTE cells. In an embodiment, the UE 200 may configure an offset parameter. If the signal strength drops below the serving LTE cell threshold criterion for triggering an A5 event by the offset parameter, the UE 200 may initiate measuring the neighbouring LTE cells without waiting for the LTE network to trigger an A3 event. In an example, if the serving LTE cell threshold criterion for triggering an A5 event is −90 dBm, and if the offset parameter configured by the UE 200 is 10 dB, then, the UE 200 may initiate measuring the neighbouring LTE cells when the signal strength at the serving LTE cell drops below −80 dBm.

The above-described operations and sub-operations in the method 600 may be performed in the order presented, in a different order, or simultaneously, according to embodiments. Further, in some embodiments, some operations or sub-operations described above in the flowchart 600 may be omitted.

The embodiments disclosed herein may be implemented through at least one software program running on at least one hardware device and performing network management functions to control the network elements. The network elements shown in FIG. 2 may include blocks which may be at least one of a hardware device, or a combination of a hardware device and a software module.

The embodiments disclosed herein describe a UE, based on NR support provided by LTE cells and an ENDC capability of the UE. Therefore, it is understood that the scope of the disclosure is extended to such a program and in addition to a computer readable medium having a message therein, such computer readable storage may contain program codes for implementation of one or more operations of the method described above, when the program runs on a server or mobile device or any suitable programmable device. The method may be implemented through or together with a software program written in example Very high speed integrated circuit Hardware Description Language (VHDL), or any other programming language, or implemented by one or more VHDL or several software modules being executed on at least one hardware device. The hardware device can be any kind of portable device that can be programmed. The hardware device may also include various components, for example, an Application-specific Integrated Circuit (ASIC), or a combination of hardware and software components or modules, for example, an ASIC and a Field Programmable Gate Array (FPGA), or at least one microprocessor and at least one memory with software modules located therein. The processor 201 shown in FIG. 2 may be implemented by this hardware device. The method described above may be implemented partly in hardware and partly in software. Alternatively, the embodiments may be implemented on different hardware devices, e.g., using a plurality of Central Processing Units (CPUs).

The foregoing descriptions of the specific embodiments will so fully reveal the general nature of the embodiments herein that others can, by applying current knowledge, readily modify and/or adapt for various applications without departing from the generic concept, and, therefore, such adaptations and modifications should be intended to be comprehended within the meaning and range of equivalents of the disclosed embodiments. It is to be understood that the phraseology or terminology employed herein is for the purpose of description and not of limitation. Therefore, those skilled in the art will recognize that the embodiments disclosed herein can be practiced with modification within the scope of the inventive concept as described in the claims.

What is claimed is:

1. A method performed by a user equipment (UE) in a wireless communication system supporting Evolved Universal Mobile Telecommunications System Terrestrial Radio Access Network (E-UTRAN) New Radio (NR)-Dual Connectivity (ENDC), the method comprising:
   receiving system information comprising information on an NR band list supported in the ENDC;
   identifying, based on the system information, NR bands supported at Long Term Evolution (LTE) frequencies of LTE bands in a most recently used (MRU) LTE frequency list of the UE;
   prioritizing the LTE frequencies in the MRU LTE frequency list, based on the supported NR bands and an ENDC capability of the UE; and
   performing a cell selection based on the prioritized LTE frequencies in the MRU LTE frequency list,
   wherein the ENDC capability of the UE indicates at least one NR band supported by the UE for each of the LTE bands supported by the UE,
   wherein the LTE frequencies in the MRU LTE frequency list are prioritized based on whether the supported NR bands match the ENDC capability of the UE, wherein the LTE frequencies in the MRU LTE frequency list comprise:
   first MRU LTE frequencies that do not support the at least one NR band of the ENDC capability of the UE,
   second MRU LTE frequencies supporting NR bands that do not match with the at least one NR band of the ENDC capability of the UE, and
   third MRU LTE frequencies supporting NR bands that match with the at least one NR band of the ENDC capability of the UE,
wherein the third MRU LTE frequencies are prioritized over the first MRU LTE frequencies and the second MRU LTE frequencies,
wherein the UE prioritizes at least two of combinations of LTE and NR bands based on peak throughputs of the at least two combinations of LTE and NR bands in a case that the UE detects at least one LTE cell supporting at least two of the combinations of LTE bands and NR bands, and
wherein the peak throughputs are determined based on an available operator bandwidth corresponding to each of the combinations of LTE and NR bands.

2. The method of claim 1, wherein the information on the NR band list indicates at least one NR band supported at each of the LTE frequencies of the LTE bands.

3. The method of claim 1, further comprising:
   initiating an LTE full band scan for preconfigured LTE bands based on the UE not being able to camp on any of the LTE frequencies in the MRU LTE frequency list;
   identifying, with respect to a first LTE cell scanned during the LTE full scan, NR support provided at an LTE frequency of an associated LTE band supported by the first LTE cell; and
   selecting the first LTE cell supporting the LTE frequency of the associated LTE band, if it is determined that the NR support provided at the LTE frequency of the associated LTE band matches the ENDC capability of the UE.

4. The method of claim 3, further comprising selecting a second LTE cell supporting an LTE frequency of an associated LTE band through the LTE full band scan if it is determined that the NR support provided at the LTE frequency of the associated LTE band, supported by the first LTE cell, does not match the ENDC capability of the UE,
   wherein a priority of the second LTE cell is lower than a priority of the first LTE cell.

5. The method of claim 4, wherein priorities of LTE cells, supporting LTE frequencies of associated bands with the NR support, are determined based on at least one of:
   a peak throughput provided by each LTE cell supporting an NR band in combination with an associated LTE band,
   a number of NR bands supported by each associated LTE band,
   a frequency range of each NR band supported by each associated LTE band, and
   whether each NR band supported by each associated LTE band is a time division duplex (TDD) band or a frequency division duplex (FDD) band.

6. The method of claim 1, further comprising:
   detecting neighbouring LTE cells supporting LTE frequencies of associated LTE bands and satisfying predefined cell reselection criteria;
   identifying NR support provided by each of the detected LTE frequencies of the associated LTE bands, based on system information received from the neighbouring LTE cells;
   creating a candidate priority list comprising the neighbouring LTE cells, wherein the neighbouring LTE cells in the candidate priority list are prioritized for cell reselection based on NR support by the neighbouring LTE cells and the ENDC capability of the UE; and
   performing the cell reselection among the neighbouring LTE cells based on the prioritized candidate priority list.

7. The method of claim 6, wherein the performing the cell reselection comprises reselecting a first LTE cell among the neighbouring LTE cells, the reselected first LTE cell being either a best LTE cell in the candidate priority list in terms of satisfying the predefined cell reselection criteria or an LTE cell that is not inferior to the best LTE cell by a predefined threshold.

8. The method of claim 7, wherein the predefined threshold is a value of a quality of service (QoS) parameter, and
   wherein the QoS parameter comprises one of a signal strength, a bandwidth, and a bit error rate (BER).

9. The method of claim 6, wherein the neighbouring LTE cells in the candidate priority list are prioritized based on at least one of:
   a peak throughput provided by each LTE cell supporting an NR band in combination with an associated LTE band,
   a number of NR bands supported by each associated LTE band,
   a frequency range of each NR band supported by each associated LTE band, and
   whether each NR band supported by each associated LTE band is a time division duplex (TDD) band or a frequency division duplex (FDD) band.

10. A user equipment (UE) in a wireless communication system supporting Evolved Universal Mobile Telecommunications System Terrestrial Radio Access Network (E-UTRAN) New Radio (NR)-Dual Connectivity (ENDC), the UE comprising:
    a communication interface; and
    a processor configured to:
       receive system information comprising information on an NR band list supported in the ENDC through the communication interface,
       identify, based on the system information, NR bands supported at Long Term Evolution (LTE) frequencies of LTE bands in a most recently used (MRU) LTE frequency list of the UE,
       prioritize the LTE frequencies in the MRU LTE frequency list, based on the supported NR bands and an ENDC capability of the UE, and
       perform a cell selection based on the prioritized LTE frequencies in the MRU LTE frequency list,
    wherein the ENDC capability of the UE indicates at least one NR band supported by the UE for each of the LTE bands supported by the UE, and
    wherein the LTE frequencies in the MRU LTE frequency list are prioritized based on whether the supported NR bands match the ENDC capability of the UE,
    wherein the LTE frequencies in the MRU LTE frequency list comprise:
       first MRU LTE frequencies that do not support the at least one NR band of the ENDC capability of the UE,
       second MRU LTE frequencies supporting NR bands that do not match with the at least one NR band of the ENDC capability of the UE, and
       third MRU LTE frequencies supporting NR bands that match with the at least one NR band of the ENDC capability of the UE, wherein the third MRU LTE frequencies are prioritized over the first MRU LTE frequencies and the second MRU LTE frequencies, wherein the UE prioritizes at least two of combinations of LTE and NR bands based on peak throughputs of the at least two combinations of LTE and NR bands in a case that the UE detects at least one LTE cell supporting at least two of the combinations of LTE bands and NR bands, and wherein the peak throughputs are determined based on an available operator bandwidth corresponding to each of the combinations of LTE and NR bands.

11. The UE of claim 10, wherein the information on the NR band list indicates at least one NR band supported at each of the LTE frequencies of the LTE bands.

12. The UE of claim 10, wherein the processor is further configured to:
   initiate an LTE full band scan for preconfigured LTE bands based on the UE not able being to camp on any of the LTE frequencies in the MRU LTE frequency list,
   identify, with respect to a first LTE cell scanned during the LTE full scan, NR support provided at an LTE frequency of an associated LTE band supported by the first LTE cell, and
   select the first LTE cell supporting the LTE frequency of the associated LTE band, if it is determined that the NR support provided at the LTE frequency of the associated LTE band matches the ENDC capability of the UE.

13. The UE of claim 12, wherein the processor is further configured to select a second LTE cell supporting an LTE frequency of an associated LTE band through the LTE full band scan if it is determined that the NR support provided at the LTE frequency of the associated LTE band, supported by the first LTE cell, does not match the ENDC capability of the UE, wherein a priority of the second LTE cell is lower than a priority of the first LTE cell.

14. The UE of claim 13, wherein priorities of LTE cells, supporting LTE frequencies of associated bands with the NR support, are determined based on at least one of:
   a peak throughput provided by each LTE cell supporting an NR band in combination with an associated LTE band,
   a number of NR bands supported by each associated LTE band,
   a frequency range of each NR band supported by each associated LTE band, and
   whether each NR band supported by each associated LTE band is a time division duplex (TDD) band or a frequency division duplex (FDD) band.

15. The UE of claim 10, wherein the processor is further configured to:
   detect neighbouring LTE cells supporting LTE frequencies of associated LTE bands and satisfying predefined cell reselection criteria,
   identify NR support provided by each of the detected LTE frequencies of the associated LTE bands, based on system information received from the neighbouring LTE cells,
   create a candidate priority list comprising the neighbouring LTE cells, wherein the neighbouring LTE cells in the candidate priority list are prioritized for cell reselection based on the NR support by the neighbouring LTE cells and the ENDC capability of the UE, and
   perform the cell reselection among the neighbouring LTE cells based on the prioritized candidate priority list.

16. The UE of claim 15, wherein the processor is configured to reselect a first LTE cell among the neighbouring LTE cells, the reselected first LTE cell being either a best LTE cell in the candidate priority list in terms of satisfying the predefined cell reselection criteria or an LTE cell that is not inferior to the best LTE cell by a predefined threshold.

17. The UE of claim 16, wherein the predefined threshold is a value of a quality of service (QoS) parameter, and
   wherein the QoS parameter comprises one of a signal strength, a bandwidth, and a bit error rate (BER).

18. The UE of claim 15, wherein the neighbouring LTE cells in the candidate priority list are prioritized based on at least one of:
   a peak throughput provided by each LTE cell supporting an NR band in combination with an associated LTE band,
   a number of NR bands supported by each associated LTE band,
   a frequency range of each NR band supported by each associated LTE band, and
   whether each NR band supported by each associated LTE band is a time division duplex (TDD) band or a frequency division duplex (FDD) band.

* * * * *